United States Patent [19]

Ikoh et al.

[11] Patent Number: 5,517,353
[45] Date of Patent: May 14, 1996

[54] ILLUMINATING APPARATUS FOR A MICROSCOPE

[75] Inventors: Chikaya Ikoh; Mikio Osaki, both of Yokohama, Japan

[73] Assignee: Nikon Corporation, Tokyo, Japan

[21] Appl. No.: 248,210

[22] Filed: May 24, 1994

[30] Foreign Application Priority Data

May 28, 1993 [JP] Japan ................................. 5-151193
Jan. 20, 1994 [JP] Japan ................................. 6-004718

[51] Int. Cl.⁶ .................................................. G02B 21/06
[52] U.S. Cl. ........................ 359/388; 359/368; 359/385; 359/821
[58] Field of Search ........................ 359/368, 383–390, 359/821, 381, 374; 250/201.3, 205, 216

[56] References Cited

U.S. PATENT DOCUMENTS 4,486,078  12/1984  Hashimoto et al. ................. 359/821
4,555,620  11/1985  Bridson et al. ..................... 359/388
4,643,540   2/1987  Kawasaki et al. .................. 359/388
4,653,878   3/1987  Nakasato et al. ................... 359/381
4,725,720   2/1988  Sawada et al. ..................... 359/385

FOREIGN PATENT DOCUMENTS 63-38911   2/1988  Japan .
   38911   4/1988  Japan ................................ 359/368
  139608   6/1991  Japan ................................ 359/385

Primary Examiner—Thong Q. Nguyen
Attorney, Agent, or Firm—Staas & Halsey

[57] ABSTRACT

An illuminating apparatus for a microscope provided with a revolver capable of selecting one of a plurality of objective lenses and inserting it into an observation optical path comprises an illuminating light source for illuminating a sample, a power source for supplying electric power to the illuminating light source, and a control device responsive to the changeover of the revolver from one of the objective lenses to another to stop the supply of electric power to the illuminating light source.

11 Claims, 16 Drawing Sheets

ILLUMINATING APPARATUS FOR A MICROSCOPE

BACKGROUND OF THE INVENTION

1. Field of the Invention

This invention relates to an illuminating apparatus for a microscope, and particularly to an illuminating apparatus for a microscope in which a revolver is rotated to thereby enable an objective lens to be interchanged.

2. Related Background Art

In a prior-art illuminating apparatus for a microscope in which a revolver is rotated to thereby interchange an objective lens and change the magnification, there are provided a lamp as an illuminating light source and a power source for supplying electric power to the lamp, and the lamp is turned on to apply light to a sample on a stage.

Now, there are two types of illumination for a sample, i.e., illumination for bright field observation and illumination for dark field observation.

The bright field observation is microscope observation using a bright field illumination method which is a very popular illumination method, and basically, it is an observation method whereby light itself illuminating a specimen is caught by an observation optical system to enable the whole of the field of view to be seen brightly, and to achieve it, there are transmission illumination and reflection illumination.

Microscope observation using the transmission illumination is an observation method for observing chiefly living specimens or samples ready to transmit light therethrough, and according to this method, a specimen is illuminated with light from a light source and the light transmitted through the specimen is observed through an observation optical system including an objective lens. Accordingly, the illumination optical system and the observation optical system are constructed discretely from each other.

Microscope observation using the reflection illumination is an observation method for observing chiefly metallic specimens hard for the transmission of light therethrough, and according to this method, a specimen is illuminated with light from a light source through an objective lens and the light reflected by the specimen is observed through an observation optical system including the objective lens. Accordingly, the objective lens is a part of the constituents of both of the illumination optical system and the observation optical system.

FIG. 15 of the accompanying drawings shows the external appearance of a microscope for this reflection illumination.

Dark field observation also is microscope observation using dark field illumination which is generally known, and is for observing specimens which are low in contrast and difficult to observe by bright field observation because of the little difference in the unevenness of the specimens. Bright field observation is such that a specimen is illuminated in such a manner as to concentrate concentric circular light which surrounds the optical axis of an observation optical system toward the optical axis and this illuminating light from the oblique direction becomes scattered light in conformity with the unevenness of the specimen and the specimen is observed with this scattered light caught by the observation optical system. When scattered light is not created, the light does not reach the observation optical system and therefore, the whole field of view is dark and only that portion thereof in which scattered light looks shining. However, since this light is light in the dark, it looks shining, but it is very dark light as compared with the light for dark field illumination.

Accordingly, if the illuminating light directly enters this dark field of view, it will become very dazzling light.

A prior-art microscope in which bright field observation and dark field observation can be changed over is described in Japanese Laid-Open Patent Application No. 63-38911. This prior-art microscope, in which bright field observation and dark field observation are selectively effected, is provided with a changeover mechanism for selectively disposing a half mirror and a ring-shaped mirror above an objective lens.

FIG. 19 of the accompanying drawings is a cross-sectional view taken along the direction of the optical axis of a so-called bright and dark field observation objective lens 151 which is a dark field observation objective lens usable also for bright field observation. During dark field observation, a ring-shaped mirror, not shown, is disposed above the objective lens 151, and light reflected therefrom passes as incident light IL through a ring-shaped illumination system lens 157 provided around an objective lens unit 155, as indicated by dots-and-dash lines, is reflected on a conical reflecting surface 158 and reaches a specimen (sample) T. Scattered light from the specimen T spreads radially as indicated by dotted lines, and part of it passes through the objective lens unit 155 so as to be observed by an observer.

FIGS. 20A and 20B of the accompanying drawings are cross-sectional views showing an objective lens 151 for bright and dark fields pivotally movable with a revolver (not shown), together with the observation optical system 159 of a microscope body.

The state shown in FIG. 20B is a state in which dark field observation is being done. In the state shown in FIG. 20B, the dark field illuminating optical path 153 of the microscope body and the dark field illuminating optical path 154 of the objective lens are aligned with each other, whereby the incident light IL passes through the two optical paths 153 and 154 to the sample T. Part of relatively dark scattered light SL from the sample T passes through the objective lens unit 155 and the observation optical system 59 of the microscope body to the observer's eye.

The state shown in FIG. 20A is a state in which the optical axes of the observation optical system 159 and the objective lens 151 deviate relative to each other, that is, deviate from an observation optical path, in order to pivotally move a revolver (not shown) to select another objective lens. In such a state, the incident light IL passed through the dark field illumination optical path 153 of the microscope body passed not through the dark field illumination optical path 154 of the objective lens, but through the lens unit 55, and intense light condensed thereby is applied to a sample supporting plate, and the reflected light SL thereof which is several times as intense as ordinary light sometimes passes through the lens unit 155 and the observation optical system 159 to the observer's eye. This will hereinafter be referred to as undesired stray light. The observer who has so far been doing dark field observation is accustomed to seeing dark light and therefor feels dazzled when intense light suddenly enters his eye.

For example, when the number of fields of an eyepiece is 25, the range on the sample T illuminated through the lens 157 of an illumination system provided in the objective lens of FIG. 19 is the range of a circle of a diameter 5 mm for an objective lens of ×5 times, and the range of a circle of a diameter 0.5 mm for an objective lens of ×50 times. The rotational speed of the revolver when the objective lens is interchanged is generally constant and therefore, the lower is the magnification of the objective lens, the more of the illuminating light enters the observer's eye during the interchange of the objective lens.

The following expression (1) represents the relation between the quantity of light I for which the objective lens affects the observation system and the characteristic value of the objective lens.

$$I \propto \left(\frac{NA}{\beta}\right)^2, \quad (1)$$

where

NA: the numerical aperture of the objective lens;

β: the magnification of the objective lens.

As shown in expression (1), the quantity of light I is proportional to the square of the numerical aperture NA of the objective lens and is inversely proportional to the square of the magnification of the objective lens. In recent years, in objective lenses, the numerical aperture NA has been improved and thus, the quantity of light to the observation system increases, and many of objective lenses of low magnification have a high numerical aperture and therefore, the phenomenon of creating stray light becomes remarkable. This phenomenon may occur in all objective lenses for bright and dark fields.

Another problem in the prior art is that a microscope wherein a revolver is of an electrically driven type has a power source for driving the revolver discretely from a power source for an illuminating light source and this increases the costs of manufacture and a wide space becomes necessary for disposing respective power source circuits.

SUMMARY OF THE INVENTION

It is an object of the present invention to provide an illuminating apparatus for a microscope in which the momentary dazzle by stray light during the rotation of a revolver is eliminated and a common power source is usable for an illuminating light source and an electric revolver to thereby meet the requirements for reduced manufacturing costs and compactness.

It is another object of the present invention to provide a microscope control apparatus which can cope with even an illuminating light source which will not immediately stop irradiation even if the supply of electric power is stopped and which can more perfectly prevent the dazzle during the interchange of an objective lens.

It is still another object of the present invention is to provide a microscope control apparatus which, when provided with a bright field observation mechanism for effecting bright field observation and a dark field observation mechanism for effecting dark field observation, can more perfectly prevent the dazzle in the interchange of an objective lens only during dark field observation.

An illuminating apparatus for a microscope according to the present invention is an illuminating apparatus for a microscope provided with an illuminating light source and a power source for supplying electric power to the illuminating light source, wherein provision is made of light source control means for stopping the supply of electric power to said illuminating light source when the objective lens of a revolver comes off an optical path, and resuming the supply of electric power to said illuminating light source when the objective lens of said revolver comes into said optical path.

In the illuminating apparatus for a microscope according to the present invention, said revolver is an electric revolver.

Further, an illuminating apparatus for a microscope according to the present invention is an illuminating apparatus for a microscope provided with an illuminating light source, a power source for supplying electric power to the illuminating light source, an electric revolver driving circuit for driving an electric revolver, and a revolver drive directing switch for directing the driving of said electric revolver, wherein provision is made of electric power supply destination changeover means for changing over the supply destination of electric power from said power source from said illuminating light source to said electric revolver driving circuit when said revolver drive directing switch is closed, and changing over the supply destination of electric power from said power source from said electric revolver driving circuit to said illuminating light source when after the closing of said revolver drive directing switch, the objective lens of said electric revolver comes into said optical path.

By the light source control means, the supply of electric power to the illuminating light source is stopped when the objective lens of the revolver comes off the optical path, and the supply of electric power to the illuminating light source is resumed when the objective lens of the revolver comes into the optical path and therefore, there is no momentary dazzle by stray light when the objective lens is interchanged.

Also, when the revolver drive directing switch is closed, the supply destination of electric power from the power source is changed over from the illuminating light source to the electric revolver driving circuit by the electric power supply destination changeover means, and when after the closing of the revolver drive directing switch, the objective lens of the electric revolver comes into the optical path, the supply destination of electric power from the power source is changed over from the electric revolver driving circuit to the illuminating light source by the electric power supply destination changeover means and therefore, there is no momentary dazzle by stray light when the objective lens is interchanged, and no power source exclusively for driving the revolver is required.

According to the present invention, there is provided a microscope control apparatus provided with an illuminating light source for effecting illumination, an electric revolver and an operating portion for giving a driving command to the electric revolver, said electric revolver being provided with a revolver for holding an objective lens, a revolver driving device for driving said revolver, and microscope control means to which said driving command is given, said microscope control means being provided with illumination control means for limiting the light of said illuminating light source being incident on said objective lens when said driving command is given, and drive control means for giving a rotation command for said revolver to said revolver driving device, said drive control means giving the command for the rotation of said revolver to said revolver driving device after a preset time elapses after said driving command is given.

Further, according to the present invention, there is provided a microscope control apparatus further provided with a bright field observation mechanism for enabling bright field observation to be done, a dark field observation mechanism for enabling dark field observation to be done, and observation mechanism changeover means for changing over said bright field observation mechanism and said dark field observation mechanism, said observation mechanism changeover means being provided with observation form judging means for judging whether the current observation form is bright field observation or dark field observation, said drive control means giving the rotation command for said revolver to said revolver driving device after a preset time elapses after said driving command is given when said observation form judging means judges that the current observation form is dark field observation.

Said electric revolver can be further provided with detecting means for detecting that said revolver has arrived at a particular position.

Said drive control means can be provided with a delay circuit for performing the delaying operation of giving the rotation command for said revolver to said revolver driving device with a preset time delay after said driving command is given.

According to said microscope control apparatus, when the driving command is given from said operating portion, said illumination control means limits the light of said illuminating light source and on the other hand, said drive control means given the rotation command to said revolver driving device after the preset time elapses.

Also, where said electric revolver is provided with said detecting means, said illumination control means restores the limited light of the illuminating light source to the state before limited when said detecting means detects that said revolver has arrived at the particular position.

Said preset time is specifically determined on the basis of a delay time set in said delay circuit.

Also, where said observation mechanism changeover means is provided with said observation form judging means, said drive control means performs said delaying operation only when said observation form judging means judges that the observation form is dark field observation.

DESCRIPTION OF THE PREFERRED EMBODIMENTS

Some embodiments of the present invention will hereinafter be described with reference to the drawings.

Figure 1:
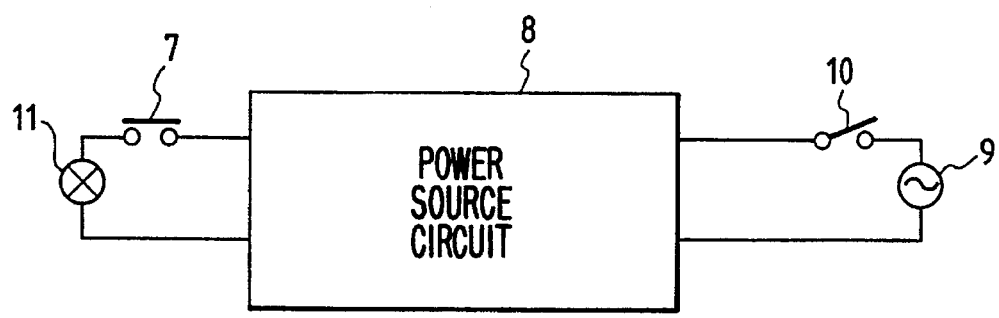
FIG. 1 is a circuit diagram of an illuminating apparatus for a microscope according to an embodiment of the present invention.
Figure 2:
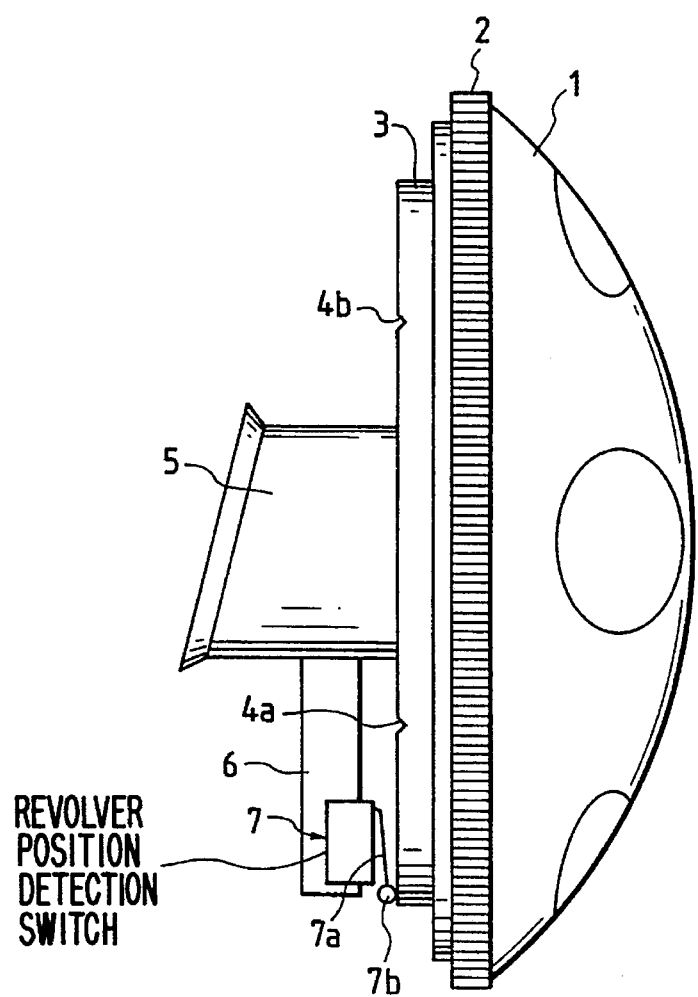
FIG. 2 is a side view of a revolver combined with the circuit of FIG. 1, illustrating a revolver position detecting switch in the circuit of FIG. 1.
Figure 3:
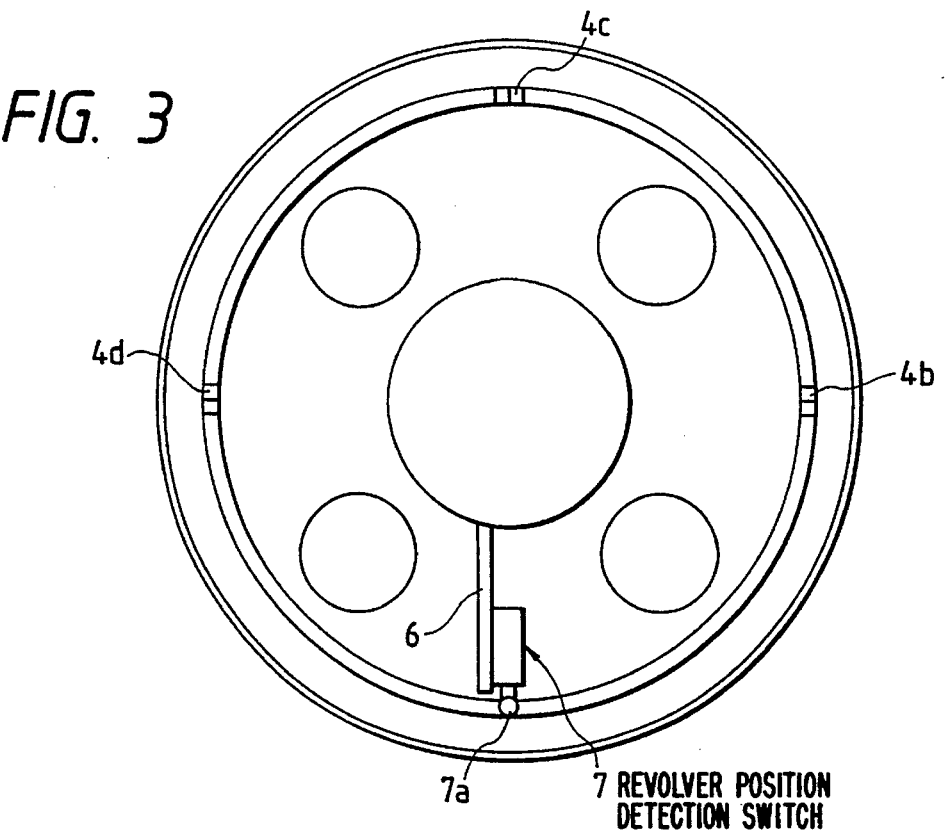
FIG. 3 is a plan view of the revolver FIG. 2.
Figure 4:
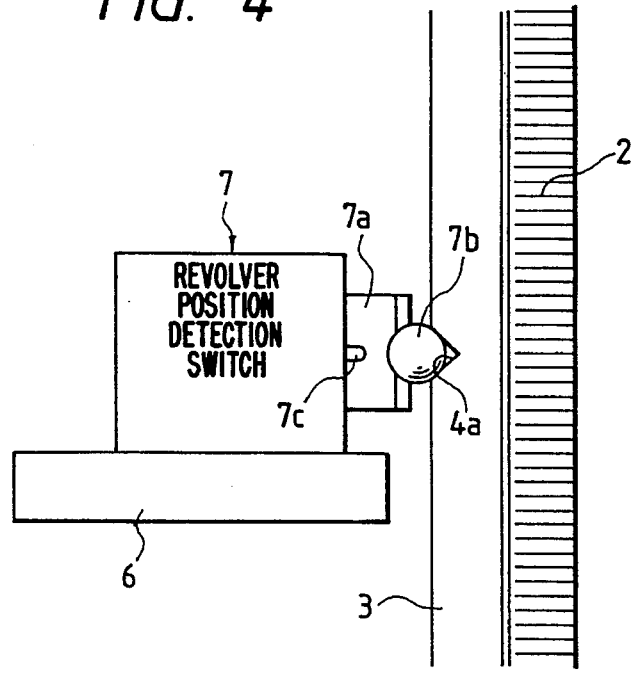
FIG. 4 is an enlarged view of a portion of the revolver of FIG. 2.

FIG. 1 is a circuit diagram of an illuminating apparatus for a microscope according to an embodiment of the present invention, FIG. 2 is a side view of a revolver combined with the circuit of FIG. 1 illustrating a revolver position detecting switch in the circuit of FIG. 1; FIG. 3 is a plan view of the revolver of FIG. 2, and FIG. 4 is an enlarged view of a portion of the revolver of FIG. 2. Teeth 2 are formed on the outer periphery of a knurl 1, one surface of the knurl 1 is formed into a convex surface, and a rail 3 is provided on the other surface of the knurl 1 along the circumferential direction thereof.

On the convex surface of the knurl 1, four objective lenses of different magnifications, not shown, are fixed at predetermined intervals along the circumferential direction.

Four grooves 4a–4d, corresponding to the four objective lenses are formed in the rail 3. The grooves 4a–4d are respectively provided at positions where they can receive a tip 7b of a revolver position detecting switch 7 each time the optical axis of the microscope is coincident with one of the optical axes of the objective lenses.

Also, a revolver mounting portion 5 connected to a microscope body, not shown, is studded on the central portion of the other surface of the knurl 1, and a radially protruding portion 6 is provided on the revolver mounting portion 5, and a revolver position detecting switch 7 is mounted on the protruding portion 6. The switch 7 includes an outwardly biased projection 7c, and the switch 7 is OFF while the projection 7c is pushed in in a well-known manner, and becomes ON when the projection 7c is outwardly protruded. A steel ball 7b is mounted on the tip end of the arm 7a of the revolver position detecting switch 7, and the steel ball 7b is urged against the rail 3 by the resiliency of the arm 7a and slides on the rail 3 as the knurl 1 is rotated. When as shown in FIG. 2, the whole of the steel ball 7b rests on the rail 3, the arm 7a pushes the projection 7c and therefore the revolver position detecting switch 7 maintains its OFF state, and when as shown in FIG. 4, a part of the steel ball 7b falls into one of the grooves 4a–4d, the arm 7a separates from the projection 7c and therefore the revolver position detecting switch 7 changes over to its ON state.

The revolver position detecting switch 7, as shown in FIG. 1, connected in series to a lamp 11 for illumination which is provided at an output side of a power source circuit 8. A main power source switch 10 is connected in series with a commercial power source 9 at an input side of the power source circuit 8.

When it becomes necessary to interchange the objective lens during the observation work after the closing of the main power source switch 10, the revolver is manually rotated. During the rotation of the revolver, the revolver position detecting switch 7 maintains its OFF state and the lamp 11 is turned off. When the optical axis of the objective lens coincides with the optical axis of the microscope, the steel ball 7b of the revolver position detecting switch 7 falls into one of the grooves 4a–4d of the rail 3 and the revolver position detecting switch 7 changes over to its ON state, whereby the lamp 11 is turned on.

According to the illuminating apparatus for a microscope according to this embodiment, the lamp 11 is turned off during the rotation of the revolver and therefore, there is no momentary dazzle by stray light when the objective lenses are interchanged.

The revolver position detecting switch 7 may be connected in series with the power source switch 10 at the input side of the power source circuit 8.

Figure 5:
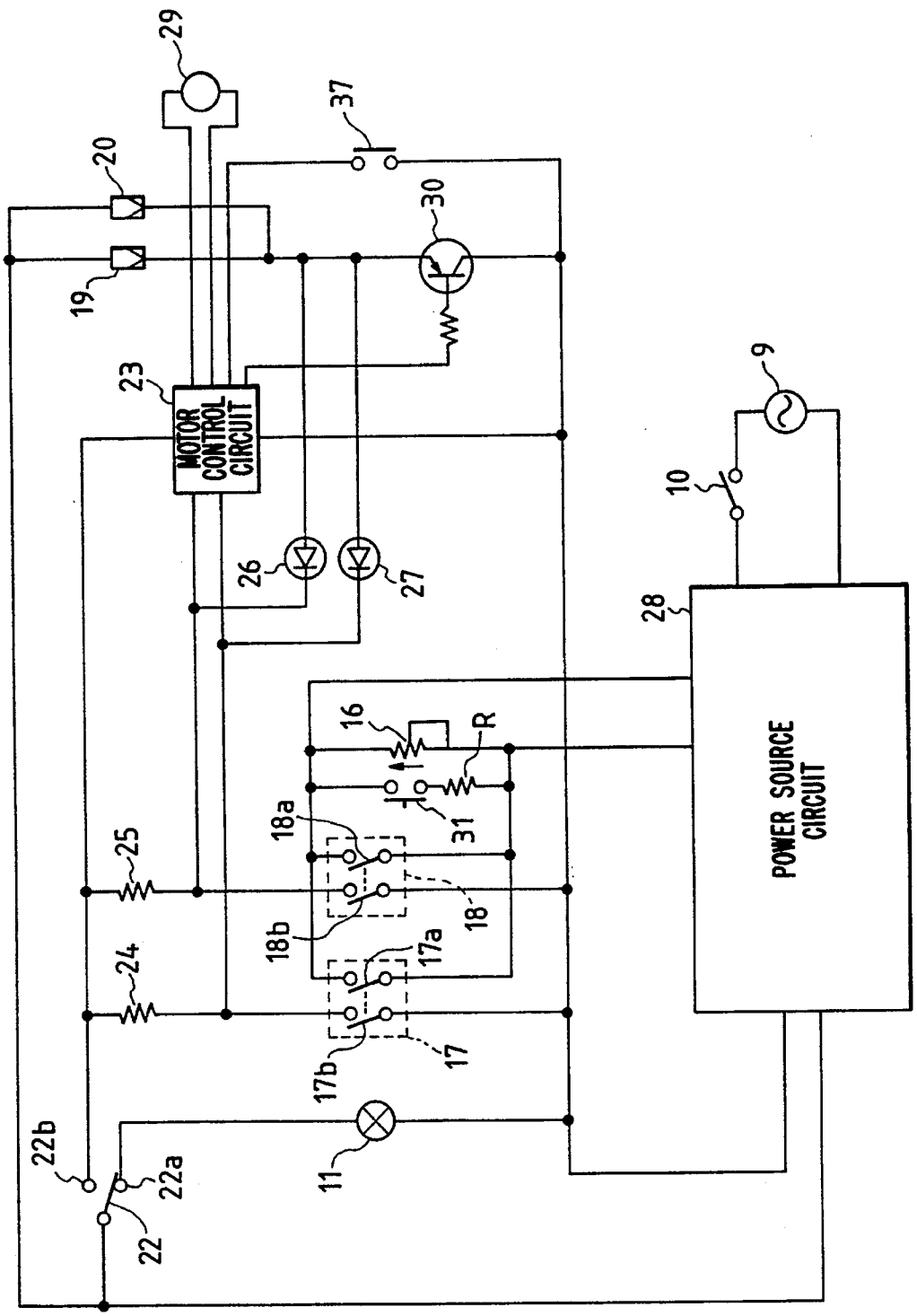
FIG. 5 is a circuit diagram of an illuminating apparatus for a microscope according to another embodiment of the present invention.
Figure 7:
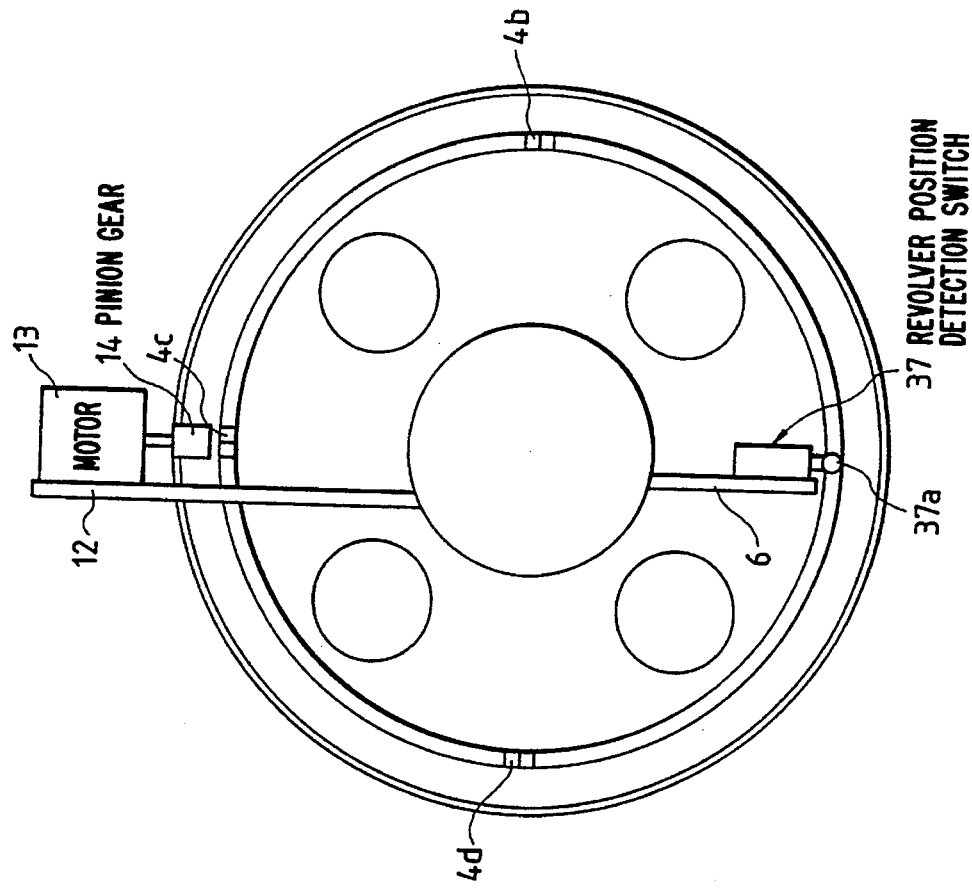
FIG. 7 is a plan view of the revolver of FIG. 6.
Figure 6:
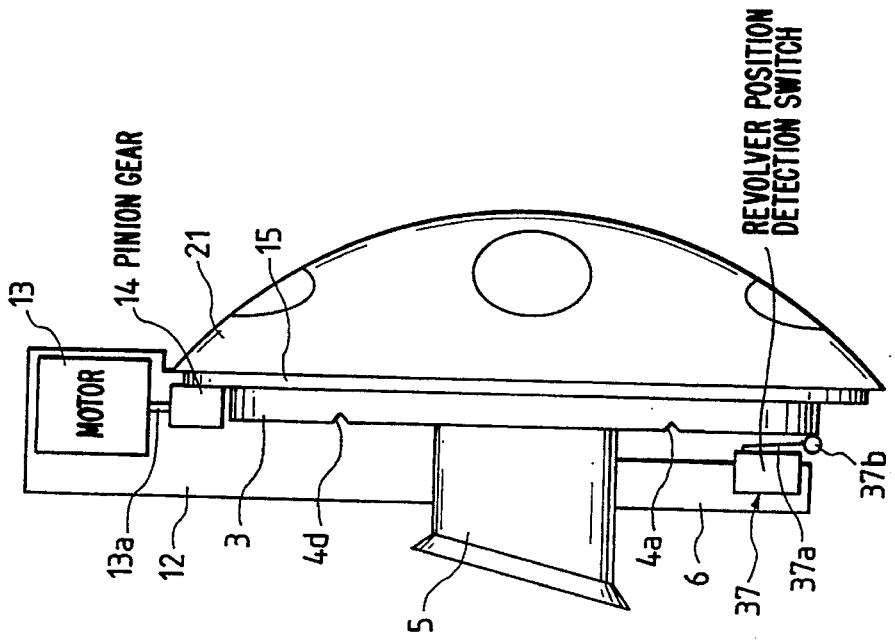
FIG. 6 is a side view of a revolver combined with the circuit of FIG. 5, illustrating a revolver position detecting switch in the circuit of FIG. 5.
Figure 8:
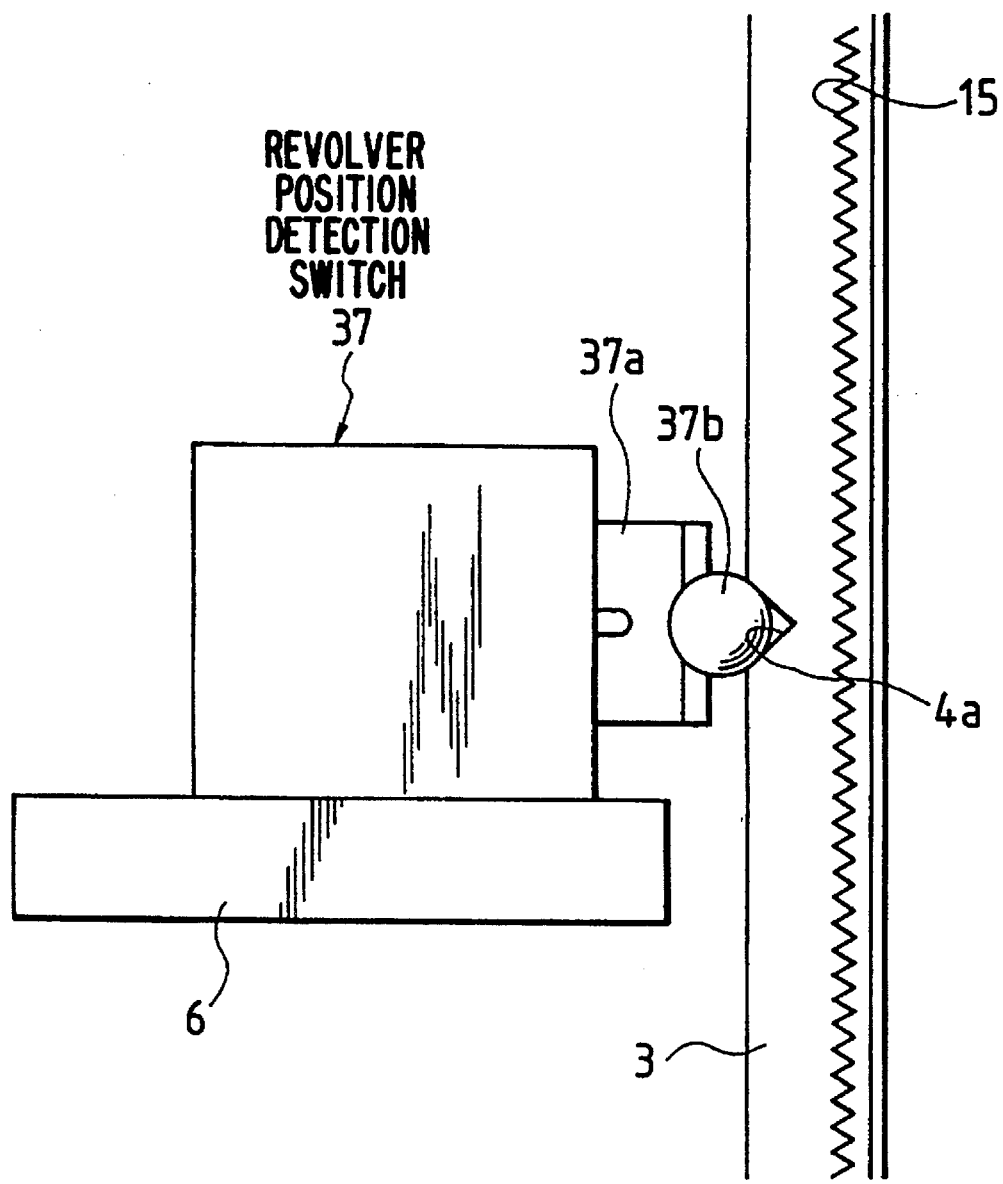
FIG. 8 is an enlarged view of a portion of the revolver of FIG. 6.
Figure 9:
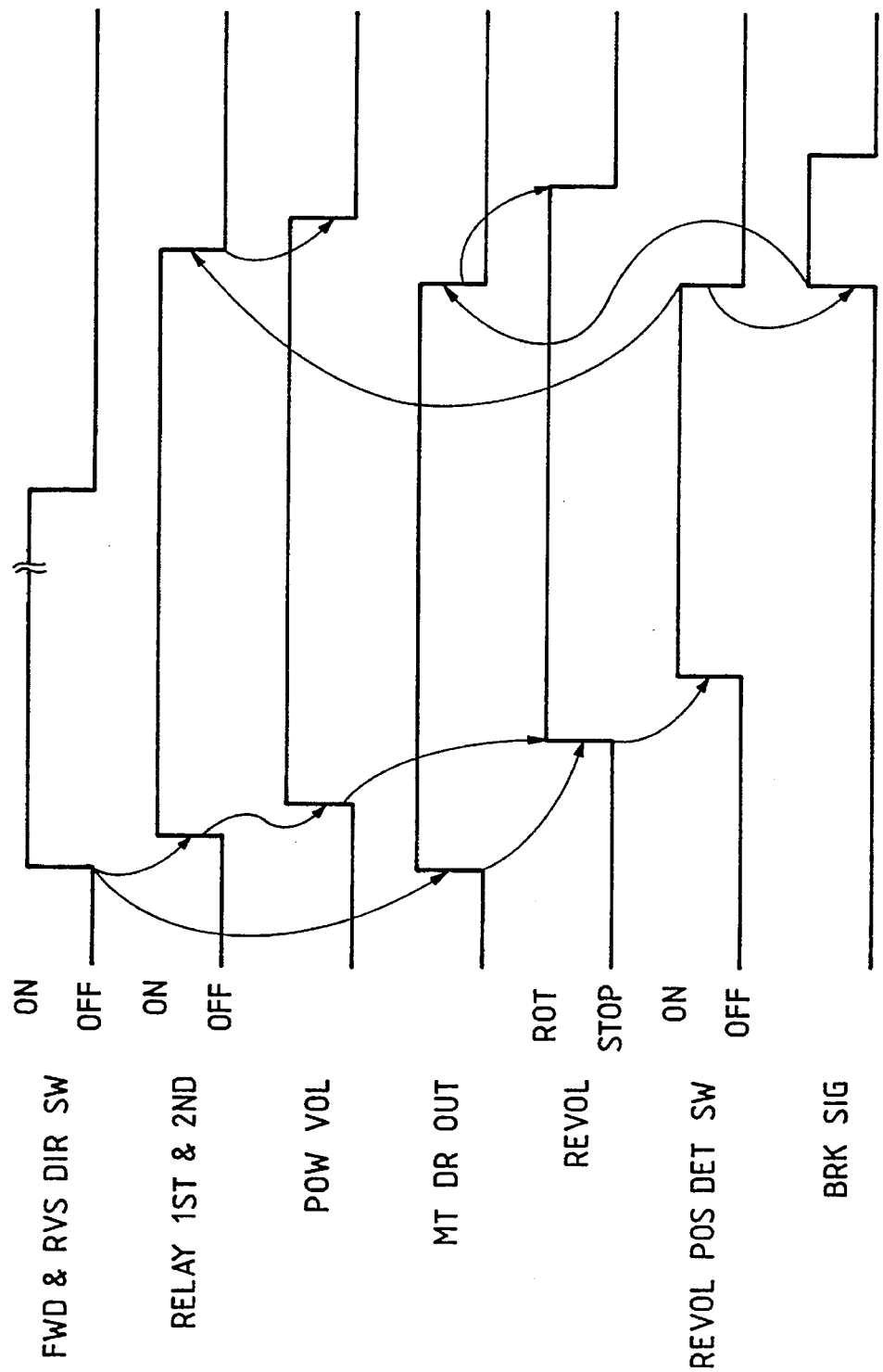
FIG. 9 is a time chart of the illuminating apparatus for a microscope.

FIG. 5 is a circuit diagram of an illuminating apparatus for a microscope according to another embodiment of the present invention, FIG. 6 is a side view of a revolver combined with the circuit of FIG. 5, illustrating a revolver position detecting switch in the circuit of FIG. 5, FIG. 7 is a plan view of the revolver of FIG. 6. FIG. 8 is an enlarged view of a portion of the revolver of FIG. 6, and FIG. 9 is a time chart of the illuminating apparatus for a microscope. In these figures, portions common to those in the previously described embodiment are given the same reference characters and need not be described.

The previously described embodiment uses a manual type revolver, while this embodiment uses an electric revolver. As shown in FIGS. 6 to 8, a motor holding plate 12 is provided on the revolver mounting portion 5, and a motor 13 is mounted on the motor holding plate 12. A pinion gear 14 is mounted on the shaft 13a of the motor 13. A rack 15 meshing with the pinion gear 14 is provided on the other surface of a knurl 21. When the electric revolver is rotated and the optical axis of the objective lens and the optical axis of the microscope deviate from one another, a revolver position detecting switch 37 becomes ON, and when the optical axis of the objective lens coincides with the optical axis of the microscope, the steel ball 37b of the revolver position detecting switch 37 falls into one of the grooves 4a–4d of the rail 3 as shown in FIG. 8, and the revolver position detecting switch 37 changes over to its OFF state.

As shown in FIG. 5, a commercial power source 9 is connected to the input side of a power source circuit 28 through a main power source switch 10. When the electric revolver is stopped, the output voltage of the power source circuit 28 can be adjusted by a volume 16. Also, the normally open switch 31 of a first relay and switches 17a and 17b are parallel-connected to the volume 16. The relay coil 19 of the first relay and the relay coil 20 of a second relay are parallel-connected to the output side of the power source circuit 28, and the lamp 11 for illumination is connected to the output side of the power source circuit 28 through the contact 22a of the switch 22 of the second relay. Also, the output side of the power source circuit 28 is connected to a motor control circuit 23 through the contact 22b of the switch 22 of the second relay. Switches 17b and 18b are connected to the contact 22b of the switch 22 of the second relay through resistors 24 and 25, respectively, and are connected to the input terminal of the motor control circuit 23.

A revolver forward rotation directing switch 17 is comprised of the switches 17a and 17b operatively associated with each other, and a revolver reverse rotation directing switch 18 is comprised of the switches 18a and 18b operatively associated with each other. The first relay is comprised of the switch 31 and the switch 31 the relay coil 19, and becomes ON by the excitation of the relay coil 19. The second relay is comprised of the switch 22 and the relay coil 20, and the switch 22 is normally biased to the contact 22a, and the switch 22 is changed over to the contact 22b by the excitation of the relay coil 20.

The input terminal of the motor control circuit 23 is connected to the output sides of the relay coils 19 and 20 through diodes 26 and 27, respectively. The output terminal of the motor control circuit 23 is connected to a motor 29, a revolver stop position detecting switch 37 and the base of a relay coil drive transistor 30. The emitter of the relay coil transistor 30 is connected to the output sides of the relay coils 19 and 20, and the collector of the relay coil drive transistor 30 is connected to an earth line.

The operation of this illuminating apparatus for a microscope will now be described with reference to FIG. 9.

When the revolver forward rotation directing switch 17 or the revolver reverse rotation directing switch 18 is once closed, the output sides of the relay coils 19 and 20 are connected to the earth line through the diodes 26 and 27, respectively, and therefore the relay coils 19 and 20 are excited, whereby the switch 31 becomes ON and the switch 22 changes over to the contact 22b, and the volume 16 is short-circuited and the output voltage of the power source circuit 28 assumes a motor driving voltage determined by the resistor R of FIG. 5, and the electric power supply destination of the power source circuit 28 changes over from the lamp 11 to the revolver rotation control circuit. At the same time, the base potential of the relay coil drive transistor 30 rises to turn on the relay coil drive transistor 30.

When a motor drive output is supplied from the motor control circuit 23 to the motor 29, the revolver begins to rotate, but actually, it begins to rotate when the output voltage of the power source circuit 28 assumes the vicinity of the driving voltage. When the revolver begins to rotate, the revolver stop position detecting switch 37 becomes ON and it is detected that the revolver is rotating. After the revolver has rotated, the relay coil drive transistor 30 maintains its ON state even if the revolver forward rotation directing switch 17 or the revolver reverse rotation directing switch 18 is opened, and therefore the first relay and the second relay are held and the revolver continues to rotate.

When the revolver rotates and the optical axes of the objective lenses coincide with the optical axis of the microscope, the revolver stop position detecting switch 37 becomes OFF. When the revolver stop position detecting switch 37 becomes OFF, a brake signal (which short-circuits the both ends of the motor 29) for braking the rotation of the motor is outputted from the one-shot pulse generating circuit, not shown, of the motor control circuit 23 for a predetermined time and at the same time, the motor drive output of the motor control circuit 23 is stopped. Also, when the revolver stop position detecting switch 37 becomes OFF and the motor drive output is stopped, the base potential of the relay coil drive transistor 30 drops and the relay coil drive transistor 30 is turned off, whereby the first relay and the second relay are released and the electric power supply destination of the power source circuit 28 changes over from the revolver rotation control circuit to the lamp 11, and the output voltage of the power source circuit 28 restores the voltage during observation. The revolver slightly rotates due to its inertia-still after the motor drive output is stopped, but the amount of such rotation is small and therefore there is no problem.

According to the illuminating apparatus for a microscope in accordance with the present embodiment, when the revolver forward rotation directing switch 17 or the revolver reverse rotation directing switch 18 is closed, the electric power supply destination of the power source circuit 28 changes over from the lamp 11 to the revolver rotation control circuit and the lamp 11 is turned off and therefore, there is no momentary dazzle by stray light when the objective lens is interchanged. Also, the apparatus has no power source exclusively for driving the revolver and a single power source is suitably changed over for common use and therefore, as compared with the example of the prior art having a revolver driving power source discretely from a power source for the illuminating light source, a reduction in the manufacturing costs and the saving of space can be realized.

In each of the above-described embodiments, it is also possible to design the apparatus such that the light of the lamp is decreased so as not to be dazzling, instead of turning off the lamp when the objective lenses come off the optical path.

As described above, according to the illuminating apparatus for a microscope in accordance with the present invention, the illuminating light source is turned off during the rotation of the revolver and therefore, there is no momentary dazzle by stray light when the objective lenses are interchanged.

Also, according to the illuminating apparatus for a microscope in accordance with the present invention, when the revolver drive directing switch is closed, the electric power supply destination of the power source changes over from the illuminating light source to the electric revolver driving circuit, whereby the illuminating light source is turned off and the electric revolver begins to rotate and therefor, there is no momentary dazzle by stray light when the objective lens is interchanged. Also, since the power source for the illuminating light source is used also as the power source for driving the electric revolver, a reduction in the manufacturing costs and the saving of space can be realized.

Thus, the above-described illuminating apparatus for a microscope has a sufficient effect as described above, but when illumination is to be controlled in the above-described illuminating apparatus for a microscope, the illumination may sometimes be not turned off in a moment due to the characteristic of the illuminating light source in use even if the supply of electric power thereto is stopped. That is, in the case of such a light source, afterglow is emitted though for a short time. Therefore, dazzling light may enter the observer's eye accustomed to dark environment. So, another embodiment which solves such a problem will hereinafter be described.

Figure 11:
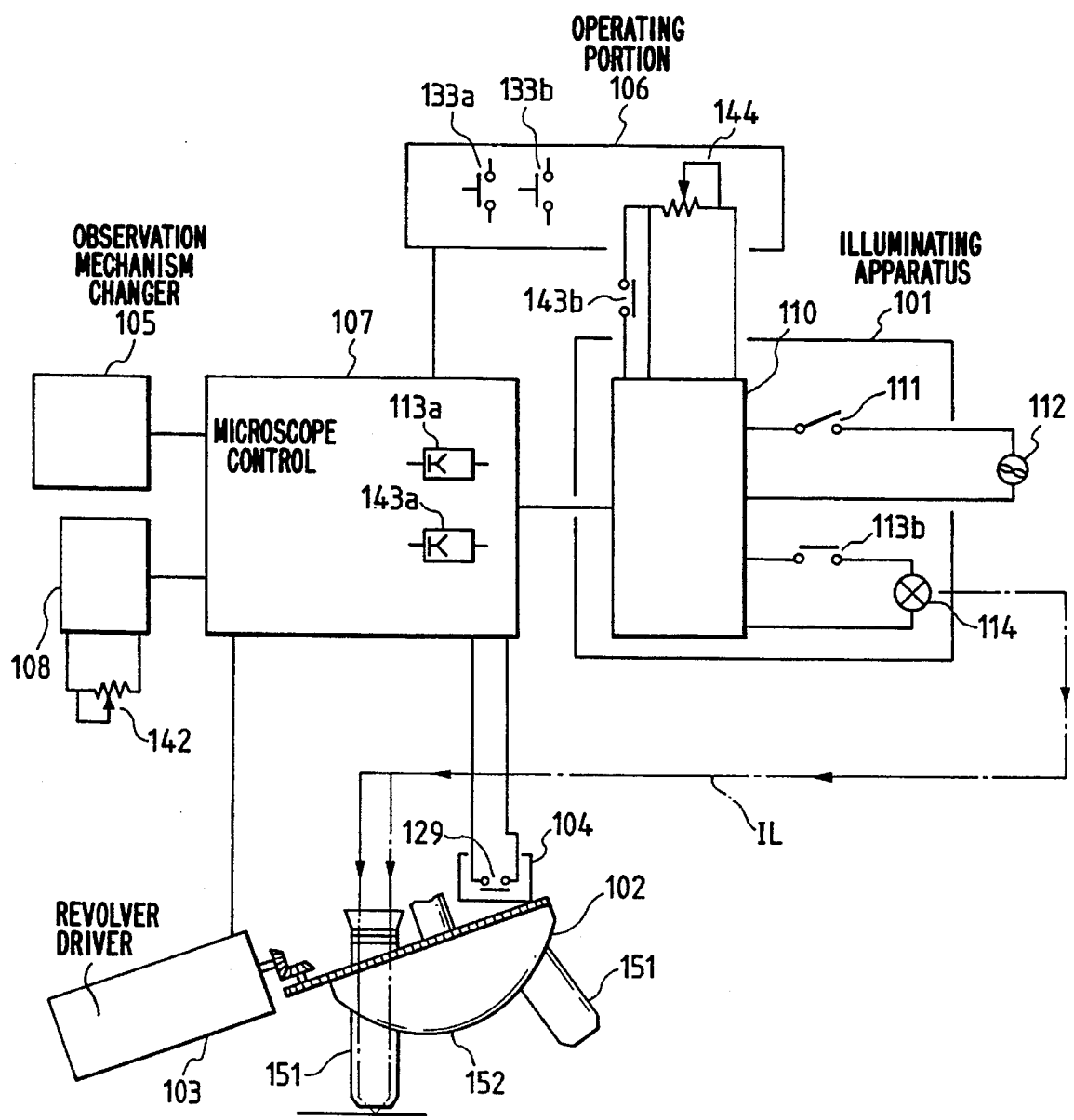
FIG. 11 is a diagram schematically showing the construction of a microscope apparatus according to an embodiment of the present invention.

FIG. 11 is a diagram schematically showing the construction of a microscope apparatus according to an embodiment of the present invention.

In FIG. 11, the microscope apparatus is provided with an illuminating apparatus 101 having an illuminating light source, an electric revolver 102, an operating portion 106 provided with an adjusting knob for changing the illuminance of said illuminating light source and a switch for giving a driving command for said electric revolver 102, microscope control means 107 for controlling said illuminating apparatus 101 and said electric revolver 102, and delay means for delaying the driving command by a preset time. Also, the microscope apparatus is provided with a bright field observation mechanism and a dark field observation mechanism, not shown, and observation mechanism changeover means 105 for changing over said bright field observation mechanism and said dark field observation mechanism.

The electric revolver 102 is provided with a revolver 152 for holding objective lenses, a revolver driving device 103 for rotating the revolver 152, and revolver position detecting means 104 for detecting the arrival of the revolver 152 at a particular position. The revolver driving device 103 is provided, for example, with an electric motor.

The constituents of the microscope apparatus will hereinafter be described.

In FIG. 11, a commercial power source 112 is connected to the input side of a power source circuit 110 through a main power source switch 111. Also, a lamp 114 for illumination which provides an illuminating light source is connected to the power source circuit 110 through a switch 113b. The power source circuit 110 is used also as a power source for driving the electric revolver.

Figure 12:
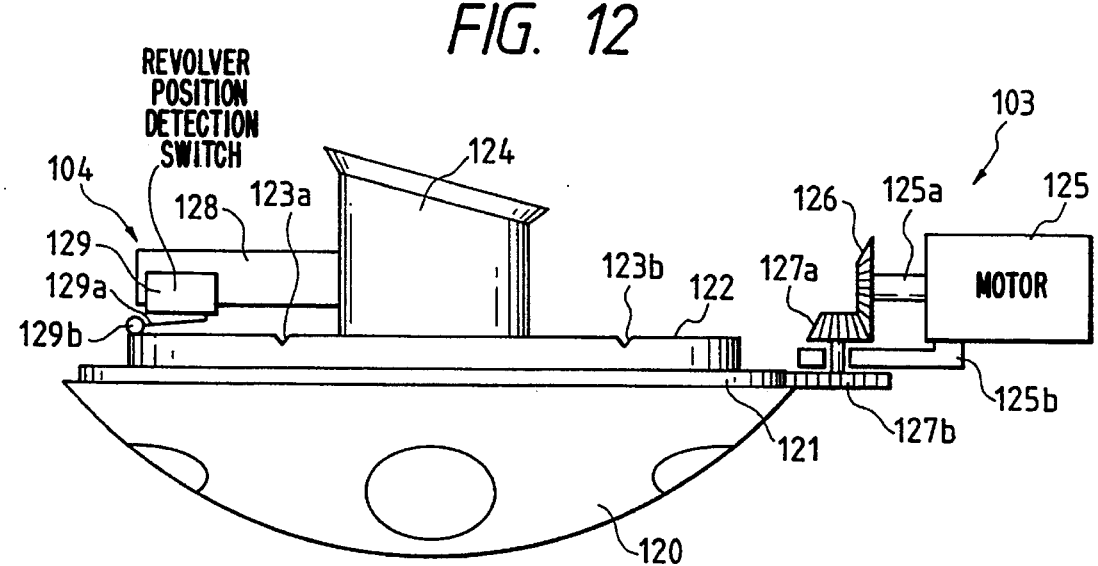
FIG. 12 is a side view of an electric revolver.
Figure 13:
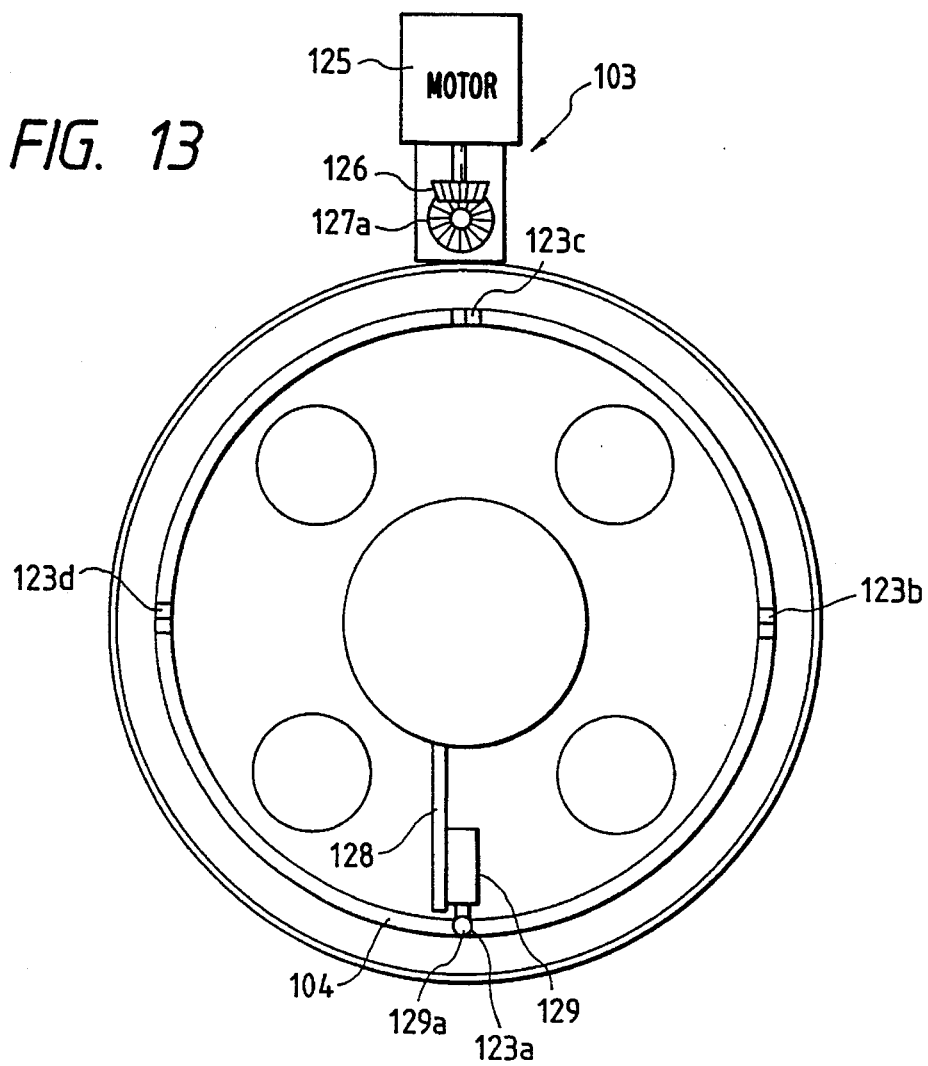
FIG. 13 is a plan view of the electric revolver of FIG. 12.

FIG. 12 is a side view of the electric revolver, and FIG. 13 is a plan view of the electric revolver.

In FIGS. 12 and 13, a gear 121 is provided on the outer periphery of a knurl 120 which provides a body. One surface of the knurl 120 is formed into a convex portion, and a rail 122 is provided on the other surface of the knurl along the circumferential direction thereof. On the convex surface of the knurl 120, four objective lenses of different magnifications, not shown, are disposed at predetermined intervals along the circumferential direction. The rail 122 are formed with the same number of grooves 123a–123d as the number of the objective lenses. The grooves 123a–123d are provided at locations whereat the optical axis of the microscope body, not shown, coincides with the optical axis of the objective lens.

The revolver driving device 103 for rotating the revolver is comprised of a motor 125, bevel gears 126, 127a, a support member 125b for rotatably supporting the bevel gear 127a, and a gear 127b.

When the motor 125 is driven to rotate the bevel gear 126 mounted on the shaft 125a of the motor 125, another bevel gear 127a mounted on a shaft lying on the same plane as the axis of the bevel gear 126 and perpendicular thereto is rotated. When the bevel gear 127a is rotated, the gear 127b having the shaft of the bevel gear 127a as its rotary shaft is also rotated. The gear 127b is provided so as to mesh with the gear 121 provided on the outer periphery of the knurl 120 and thus, can rotate the revolver. The revolver position detecting switch is of a construction similar to that in the aforedescribed embodiment and therefore need not be described in detail.

Figure 10:
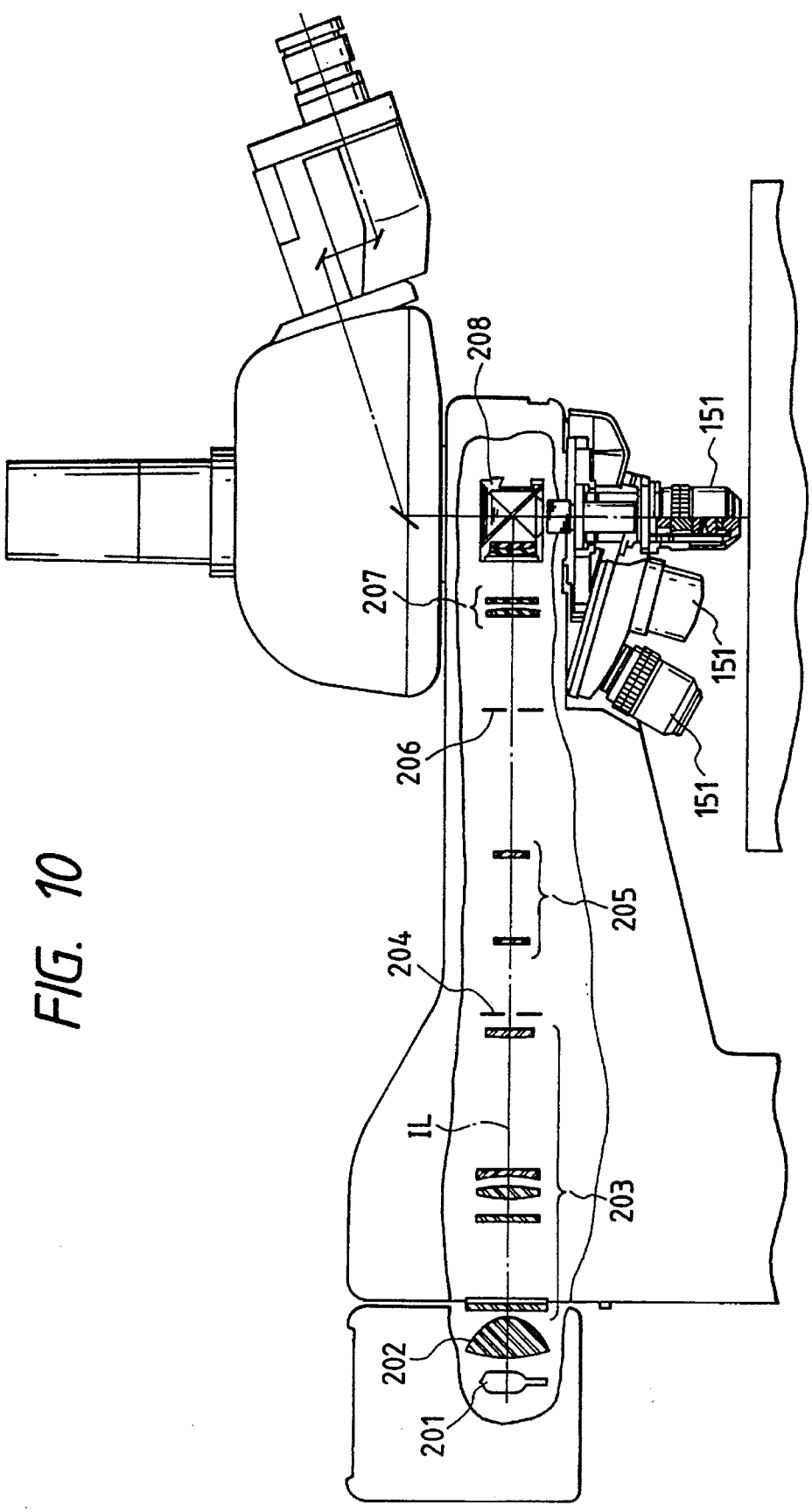
FIG. 10 is a side view of a microscope in which bright field observation and dark field observation can be changed over.

FIG. 10 is a side view, partly in cross-section, of a microscope in which bright field observation and dark field observation can be changed over. In FIG. 10, illuminating light IL emitted from a lamp 201 is collimated by a collector lens 202, passes through a first lens unit 203, an aperture stop 204, a second lens unit 205, a field stop 206 and a third lens unit 207 to observation mechanism changeover means 208 is reflected by the half mirror thereof or a ring-shaped mirror, and passes through an objective lens 151 to a sample. Incidentally, a light passage running from the block 208 to an eye piece is simply drawn in FIG. 10 because it does not directly relate to the invention.

Figure 14B:
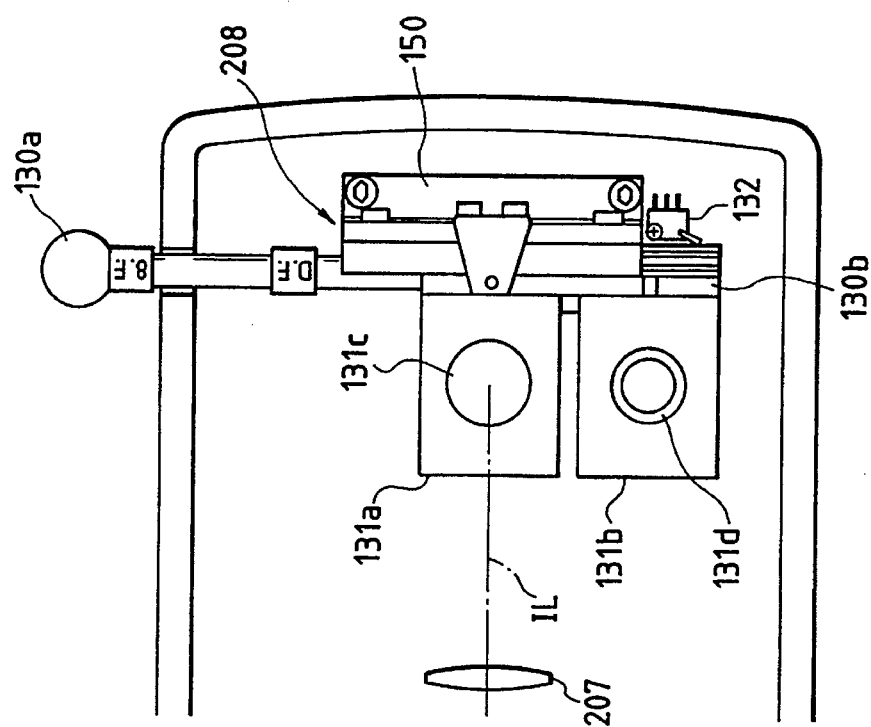
FIGS. 14A and 14B are plan views showing an example of observation mechanism changeover means.
Figure 14A:
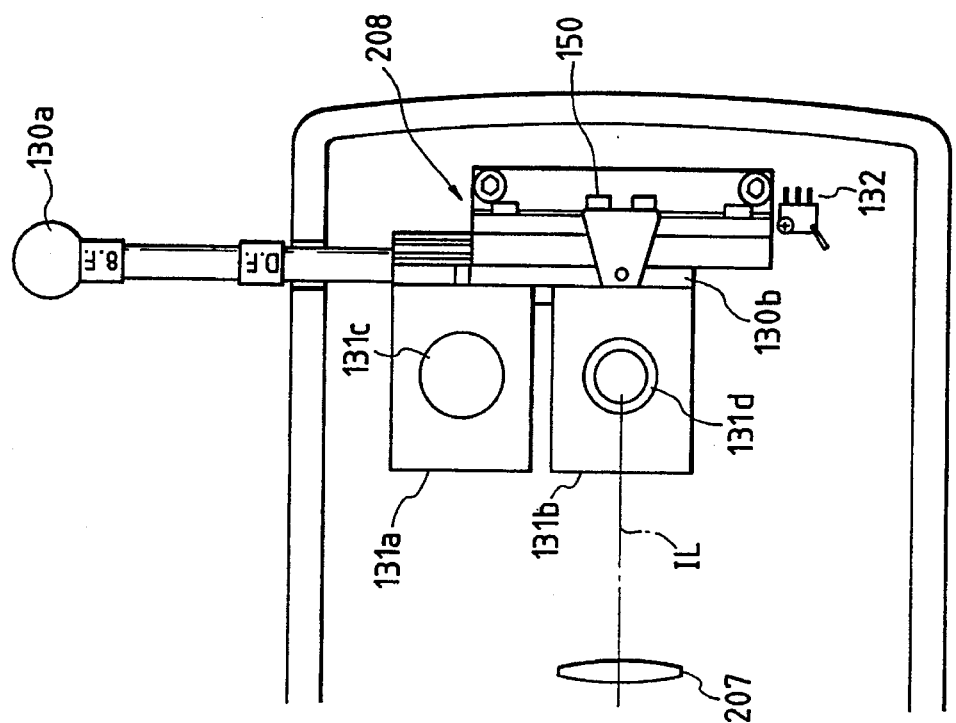

FIGS. 14A and 14B are plan views showing an example of the observation mechanism changeover means 208.

In FIGS. 14A and 14B, a bright field observation mechanism 131a for use when bright field observation is done and a dark field observation mechanism 131b for use when dark field observation is done are fixed to a slide member 130b. The slide member 130b is supported for reciprocal movement on a support member 150. A slide arm 130a for effecting the changeover of bright field observation and dark field observation from the outside of the microscope body is fixed to the slide member 130b. A bright field/dark field judging switch 132 is provided at a location whereat the tip end portion of the slide member 130b bears against the switch 132 when the slide arm 130a is pushed toward the body side.

When as shown in FIG. 14B, the slide arm 130a is pushed toward the body side until it is stopped, and the bright field observation mechanism 131a is inserted into an observation optical path, the incident light IL from the third lens unit 207 is reflected by the half mirror 131c and travels toward the objective lens, whereby bright field observation can be done. Also, when as shown in FIG. 14A, the slide arm 130 is moved so as to be drawn out until it is stopped, and the dark field observation mechanism 131b is set, the incident light IL is reflected by the ring-shaped mirror 131d, whereby dark field observation can be done. Correspondingly to these operations, the tip end portion of the slide member 130b changes over the bright field/dark field judging switch 132.

When the changeover of bright field observation and dark field observation is to be effected not manually as described above but automatically, the bright field observation state and the dark field observation state may be detected by the utilization of the signal of a changeover switch for effecting the changeover of bright field observation and dark field observation.

Figure 15:
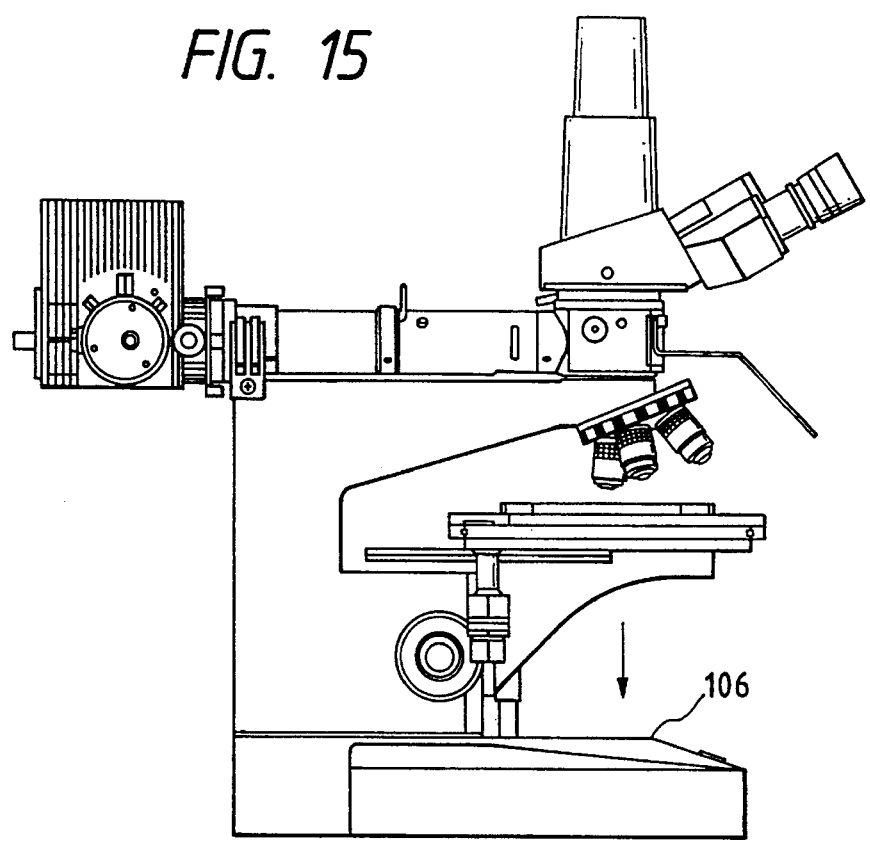
FIG. 15 is a side view showing an example of a microscope provided with an operating portion.

FIG. 15 is a side view showing an example of a microscope provided with an operating portion 106.

Figure 16:
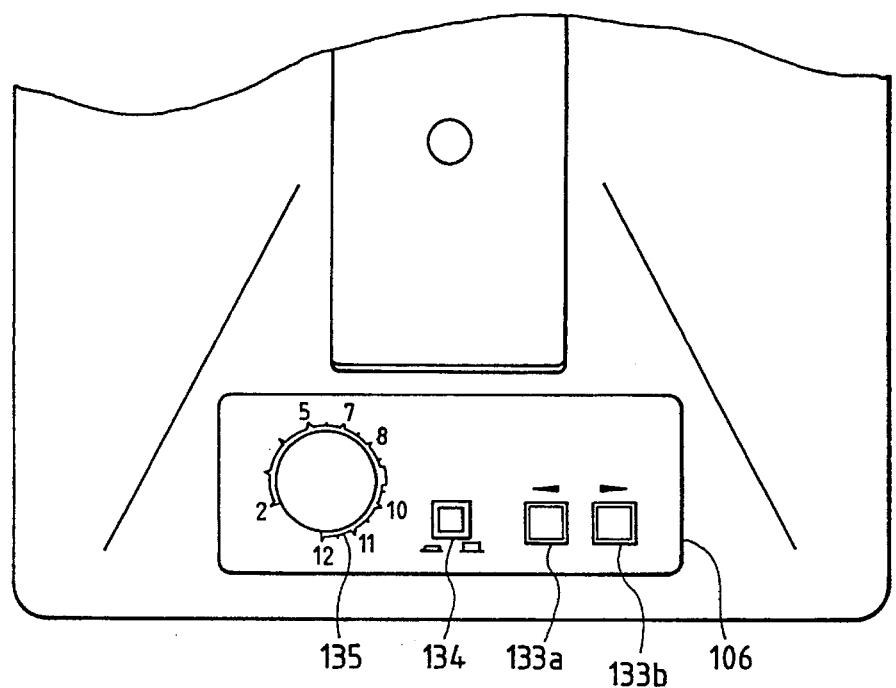
FIG. 16 is a view of the operating portion of FIG. 15 as it is seen in the direction of arrow in FIG. 15.

FIG. 16 is a view of the operating portion of FIG. 15 as it is seen in the direction of arrow in FIG. 15.

In FIG. 16, the operating portion 106 is provided with a revolver forward rotation directing switch 133a and a revolver reverse rotation directing switch 133b for giving a driving command for the electric revolver, a bright field/dark field observation changeover switch 134, and an illuminance adjusting knob 135 for adjusting the illuminance of the lamp for illumination.

When the bright field/dark field observation changeover switch 134 is changed over, the bright field observation mechanism and dark field observation mechanism as shown in FIGS. 14A and 14B are changed over correspondingly to the changeover of the switch 134, and the bright field/dark field judging switch not shown in FIG. 16 also responds. The switch 132 may be designed so as not to correspond to the bright field/dark field observation changeover switch 134 for the purpose of saving the disposition space and cost, but to be manually changed over.

Figure 17:
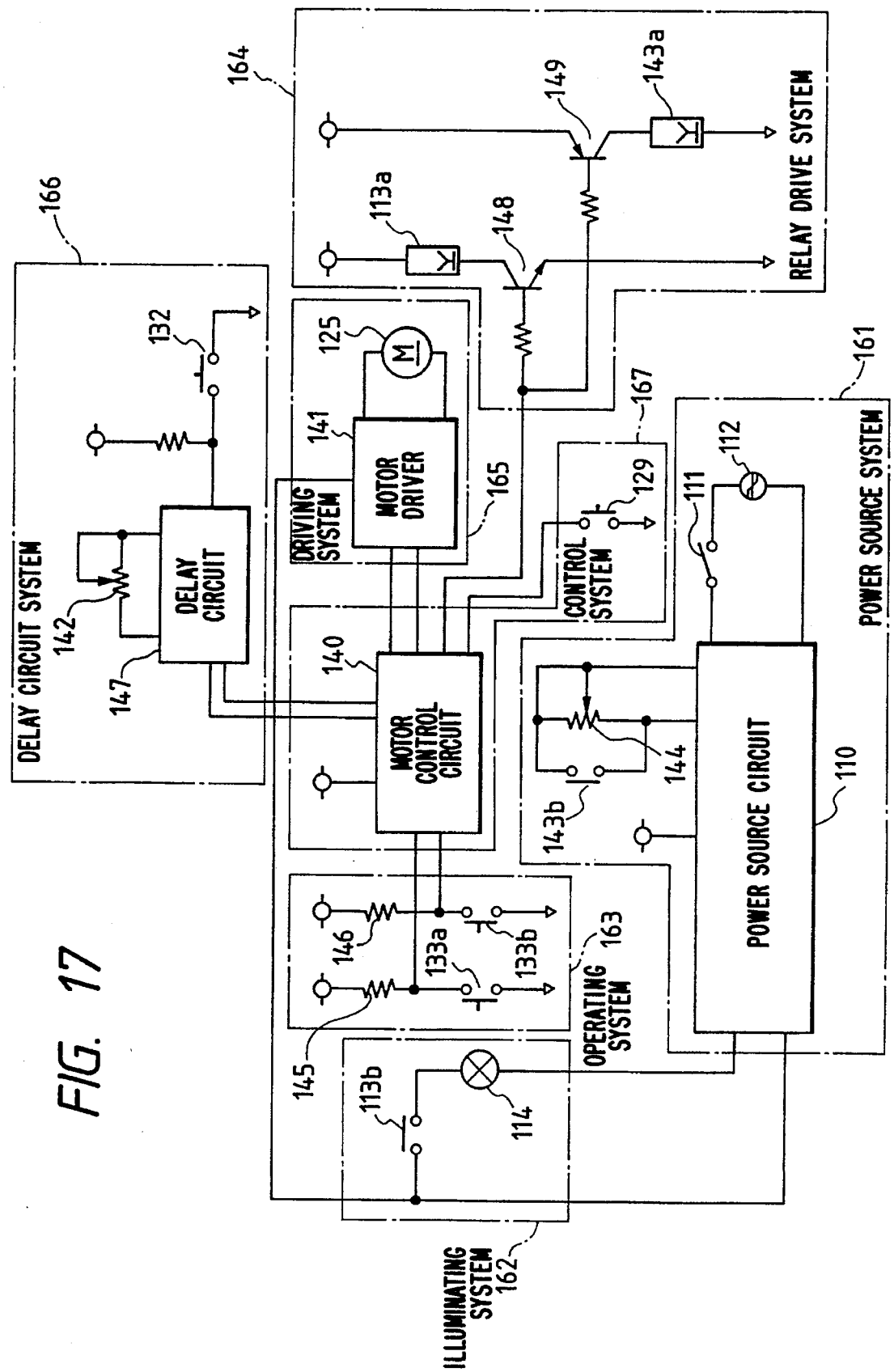
FIG. 17 is a circuit diagram for illustrating the microscope control means of the present invention.

FIG. 17 is a circuit diagram for illustrating the microscope control means of the present invention.

The circuit shown in FIG. 17 is provided with a power source system 161 including the power source circuit 110, an illuminating system 162 including the lamp 114 for illumination, an operating system 163 including the revolver forward rotation directing switch 133a and the revolver reverse rotation directing switch 133b, a relay drive system 164 for driving the relays, a driving system 165 including the motor 125, a delay circuit system 166 including the delay circuit portion 147 and the bright field/dark field judging switch 132, and a control system 167 including the motor control circuit 140.

In the power source system 161, the commercial power source 112 is connected to the input side of the power source circuit 110 through the main power source switch 111. The output voltage of the power source circuit 110 can be adjusted by a variable resistor 144 when the electric revolver is stopped. The normally open switch 143b of the first relay which will be described later is parallel-connected to the variable resistor 144.

In the illuminating system 162, the lamp 114 for illumination is series-connected to the normally open switch 113b of the second relay which will be described later, and is connected to the output side of the power source circuit 110.

In the operating system 163, the revolver forward rotation directing switch 133a and the revolver reverse rotation directing switch 133b are connected to the power source circuit 110 through resistors 145 and 146, respectively, and the junction between the resistors 145 and 146 is connected to the input terminal of the motor control circuit 140.

The construction of the relays is as follows.

The first relay is comprised of the normally open switch 143b and the relay coil 143a, and the switch 143b becomes ON by the excitation of the relay coil 143a. The second relay is comprised of the normally open switch 113b and the relay coil 113a, and the switch 113b becomes ON by the excitation of the relay coil 113a.

In the driving system 165, the motor driving portion 141 is connected to the output side of the power source circuit 110, whereby electric power is supplied. Also, the output terminal of the motor control circuit 140 and the motor 125 are connected to the motor driving portion 141.

In the relay drive system 164, the base portions of relay coil drive transistors 148 and 149 are connected to the output terminal of the motor control circuit 140. The collector of the relay coil drive transistor 148 is connected to the output side of the relay coil 113a, and the emitter of the transistor 148 is connected to an earth line. The collector of the relay coil drive transistor 149 is connected to the input side of the relay coil 143a, and the emitter of the transistor 149 is connected to the power source circuit 110.

In the delay circuit system 166, the delay circuit portion 147 for delaying a motor drive output signal outputted to the motor driving portion 141 by the motor control circuit 140 is connected to the input terminal of the motor control circuit 140. A variable resistor 142 is connected to the delay circuit portion 147, and the delay time of said output signal can be set arbitrarily by the variable resistor 142. The bright field/dark field judging switch 132 is also connected to the delay circuit portion 147 so as to be able to judge bright field observation and dark field observation. When one of a revolver forward rotation directing signal and a revolver reverse rotation directing signal is inputted from the operating system 163 to the delay circuit portion 147 and the signal of the bright field/dark field judging switch 132 means dark field observation, the delay circuit portion 147 outputs a driving signal to the motor control circuit 140 after a delay time based on the time constant of the delay circuit portion 147 which is set by the variable resistor 142.

In the control system 167, the operating system 163 and driving system 165 are connected to the motor control circuit 140. The revolver position detecting switch 129 is also connected to the motor control circuit 140.

Figure 21:
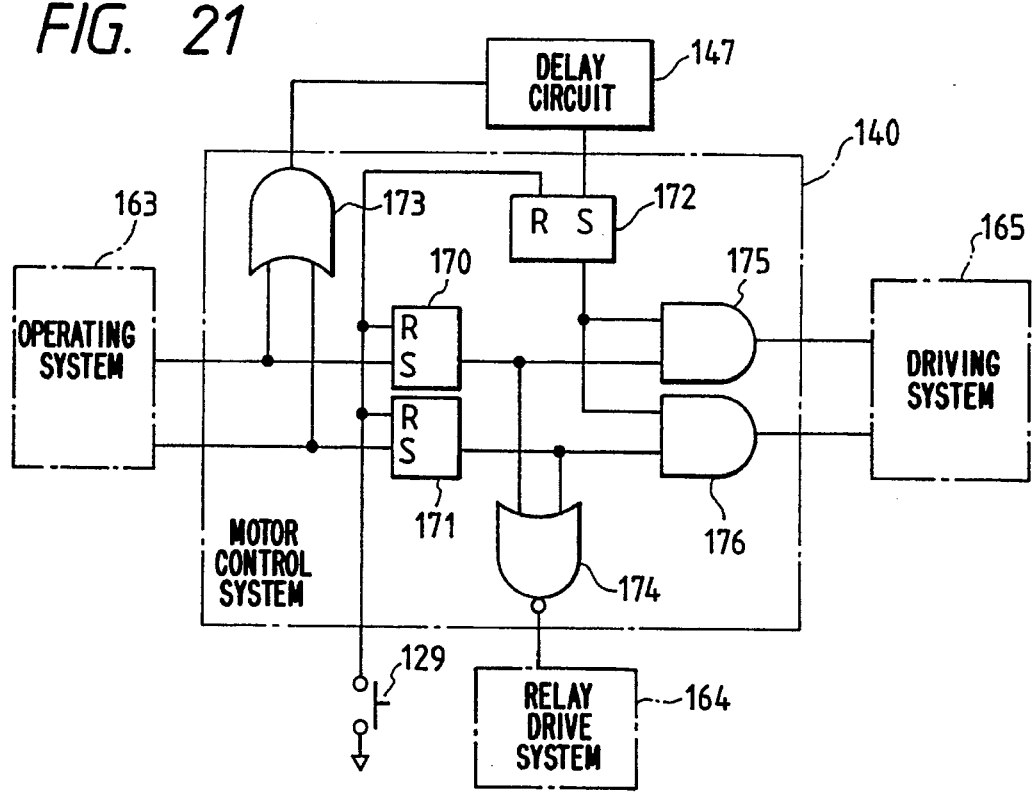
FIG. 21 is a circuit diagram showing an example of a motor control circuit.

The motor control circuit 140 is constructed as shown, for example, in FIG. 21.

Referring to FIG. 21, the motor control circuit 140 is provided with latch circuits 170 and 171 for latching the forward rotation and reverse rotation directing commands, respectively, from the operating system 163, an OR gate 173 for taking the logical sum of the forward rotation directing command and the reverse rotation directing command, a latch circuit 172 for latching the output of the delay circuit portion 147, AND gates 175 and 176 for taking the logical sums of the output of the latch circuit 172 and the results latched by the latch circuits 170 and 171, and a NOR gate 174 for taking the invention of the logical sum of the outputs of the latch circuits 170 and 171.

The operation of this motor control circuit will now be described.

Upon reception of the forward rotation and reverse rotation directing commands from the operating system 163, the latch circuits 170 and 171 corresponding thereto latch the commands. Also, upon reception of one of the forward rotation and reverse rotation directing commands, the OR gate 173 outputs a trigger signal. On the other hand, for example, in the case of the forward rotation directing command, the output of the latch circuit 170 assumes a high level, and in the case of the reverse rotation directing command, the output of the latch circuit 171 assumes a high level.

Now, the case of the forward rotation directing command will be described. In the case of the forward rotation directing command, the latch circuit 170 assumes a high level. Accordingly, by this output, the NOR gate 174 puts out a low-level output to the relay drive system 164. Also, the high-level output of the latch circuit 170 is inputted to the AND gate 175, and the low-level output of the latch circuit 171 is inputted to the other AND gate 176. On the other hand, upon reception of the trigger signal from the OR gate 173, the delay circuit portion 147 counts it for a predetermined time and performs the delaying operation, and thereafter puts out a high-level output. When the high-level output of the delay circuit portion 147 is inputted to the latch circuit 172, the output of the latch circuit 172 is set to a high level. Since the outputs of the latch circuits 170 and 171 are inputted to the AND gates 175 and 176, respectively, the AND gate 175 to which the aforementioned high-level output of the latch circuit 170 is inputted puts out a high-level output. On the other hand, the aforementioned low-level output of the latch circuit 171 is inputted to the AND gate 176. Thus, a forward rotation signal is outputted to the driving system 165. Upon reception of this forward rotation signal, the motor rotates the revolver. Further, when the revolver position detecting switch 129 detects that the revolver has begun to rotate and has come to a predetermined position, the latch circuits 170, 171 and 172 are reset. Accordingly, the output of the latch circuit 170 assumes a low level, and the output of the AND gate 175 also assumes a low level. At this time, the output signal of the relay drive signal assumes a high level.

Figure 18:
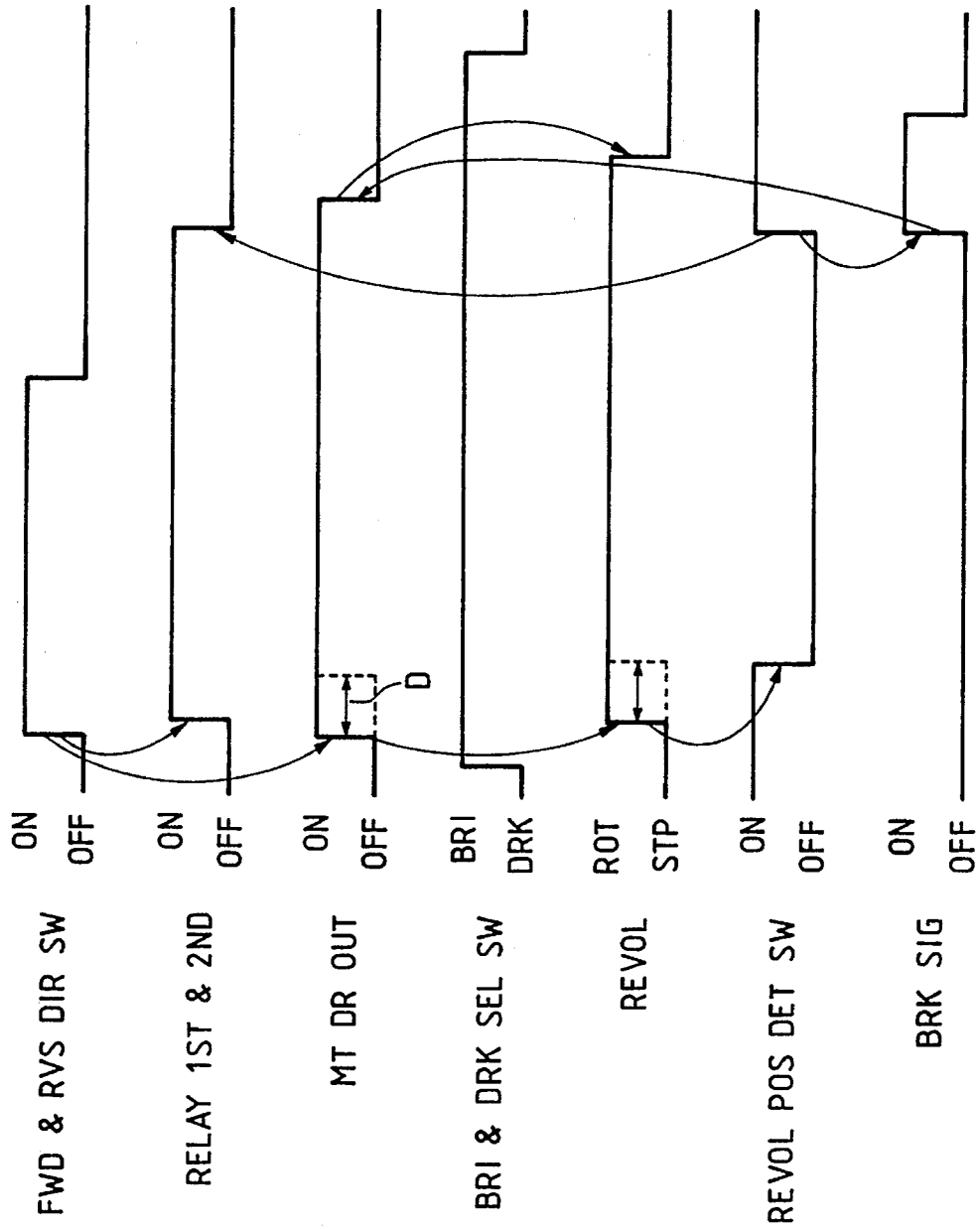
FIG. 18 is a time chart concerned with the microscope control means of the present invention.
Figure 19:
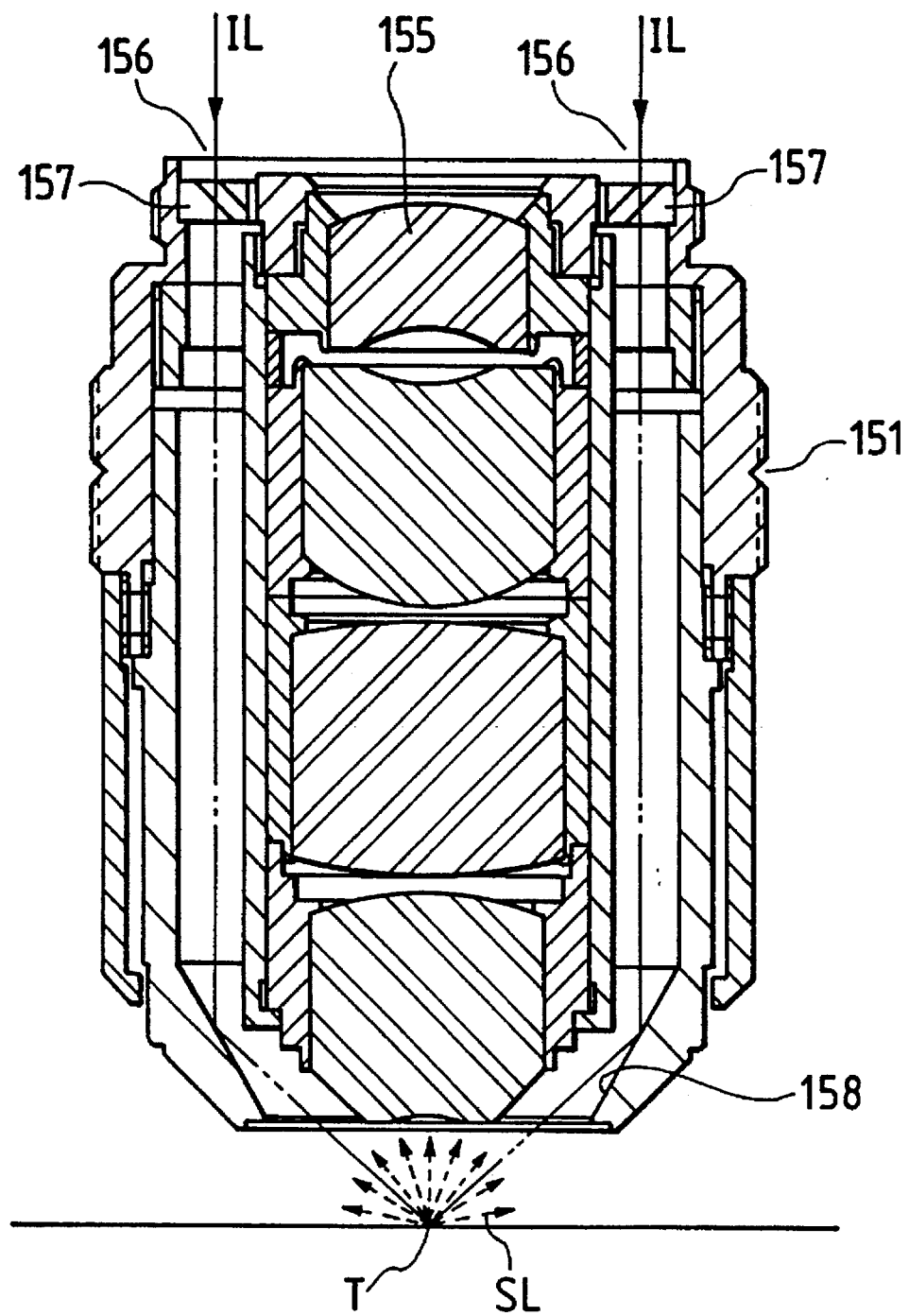
FIG. 19 illustrates incident light and scattered light in an objective lens for bright and dark fields of view.
Figure 20A:
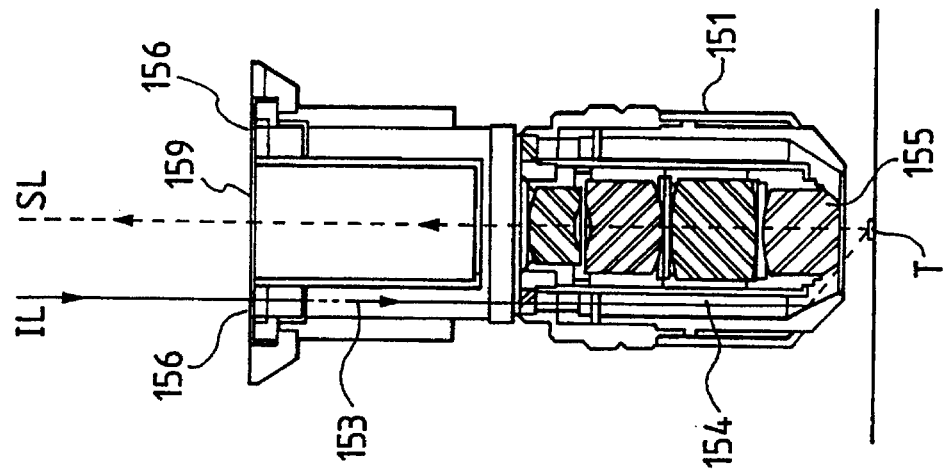
FIGS. 20A and 20B are illustrations of a revolver provided with the objective lens of FIG. 19.
Figure 20B:
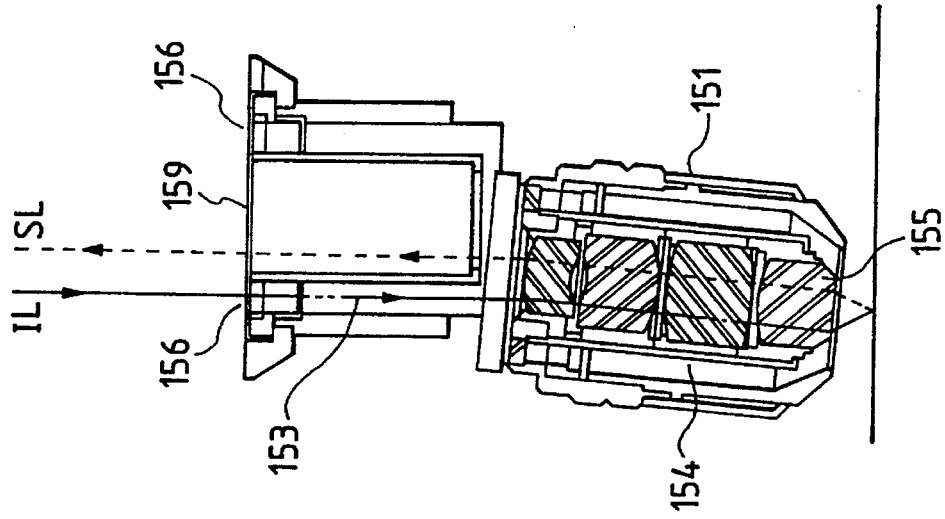

FIG. 18 is a time chart concerned with the microscope control means of the present invention.

The operation of the circuit of FIG. 17 will hereinafter be described with reference to FIG. 18.

In the circuit shown in FIG. 17, it is to be understood that the main power source switch 111 has been closed and the normally open switch 143b of the first relay 143 is in its open state and the normally open switch 113b of the second relay 113 is in its closed state, that is, the lamp 114 for illumination is turned on and observation is possible.

When at this time, one of the revolver forward rotation directing switch 133a and the revolver reverse rotation directing switch 133b is closed, the motor control circuit 140 changes over the motor drive output signal to the motor driving portion 141 from OFF to ON, in the case of bright field observation (the solid-line portion in FIG. 18).

At this time, the potentials of the base portions of the relay coil drive transistors 148 and 149 are lowered, whereby the electric current which has so far flowed to the base portion of the relay coil drive transistor 148 is caused to flow to the base portion of the relay coil drive transistor 149. Thereupon, the relay coil drive transistor 148 becomes turned off and the relay coil drive transistor 149 becomes turned on and therefore, the relay coil 113a of the second relay becomes deenergized and the relay coil 143a of the first relay is excited.

By the above-described operation, the normally open switch 113b of the second relay 113 becomes open, the lamp 114 for illumination is turned off and the normally open switch 143b of the first relay 143 becomes closed and therefore, the electric power supply destination of the power source circuit 110 Changes over from the lamp 114 for illumination to the motor driving portion 141. Thereupon, the motor driving portion 141 is immediately driven and the revolver begins to rotate.

When the observation mode is changed over to the dark field observation state by the observation mechanism changeover means 208 (FIG. 14A), it is judged by the bright field/dark field judging switch 132 provided in the changeover means 208 that the observation mode is the dark field observation state, and when at this time, one of the revolver forward rotation directing switch 133a and revolver reverse rotation directing switch 133b of the operating system 163 is closed, the motor control circuit 140 changes over the motor drive output signal to the motor driving portion 141 from OFF to ON after the lapse of the delay time D of the delay circuit portion 147 (the broken-line portion in FIG. 18).

When the revolver begins to rotate, the revolver position detecting switch 129 becomes OFF and it is detected that the revolver is rotating.

When the revolver rotates further and the optical axis of the objective lens coincides with the optical axis of the microscope body, the revolver position detecting switch 129 becomes ON. Thereupon, the normally open switch 143b of the first relay 143 becomes open and the normally open switch 113b of the second relay 113 becomes closed, whereby the electric power supply destination of the power source circuit 110 changes over from the motor driving portion 141 to the lamp 114 for illumination. At this time, the motor control circuit 140 renders the motor drive output signal to the motor driving portion 141 OFF, and a brake signal for controlling the rotation of the motor 125 is outputted from a circuit, not shown, for a predetermined time.

In the above-described embodiment, it is also possible to design the apparatus such that the lamp for illumination is not turned off but a light decreasing filter is inserted into the illumination optical path or the voltage of the power source for the lamp for illumination is adjusted to thereby decrease the light entering the observation system so as not to be dazzling. Also, instead of turning off the lamp for illumination, provision can be made of a mechanism for intercepting the illumination optical path, such as a shutter insertable into the illumination optical path. If the optical path is intercepted, it may be impossible to use the power source in common, but the luminance of the lamp for illumination will not vary and therefore, shift can be quickly made to observation.

Figure 22:
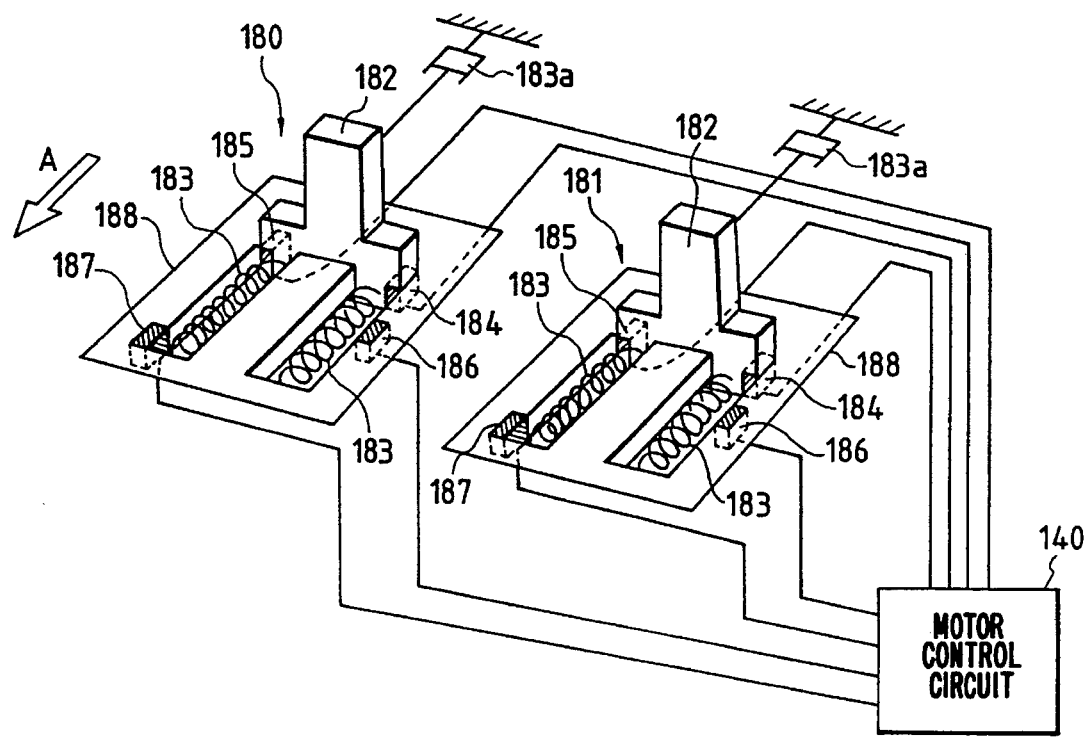
FIG. 22 is an illustration of a switch having mechanistic delay means.

Also, if a slide switch 180 for forward rotation and a slide switch 181 for reverse rotation as shown, for example, in FIG. 22 are provided as the revolver forward rotation and reverse rotation directing switches of the operating system 163 so that as will be described below, the motor control circuit 140 can respond to the inputs from these switches based on the operator's manual operation, the rotation command for the revolver can be delayed. In FIG. 22, levers 182 are connected to dampers 183a, respectively, are biased in the direction opposite to the direction of arrow A by springs 183, and are normally in positions shown in FIG. 22. For example, when a forward rotation command is to be given to the revolver, the operator moves the lever 182 of the revolver forward rotation directing switch 180 in the direction of arrow A. Thereby, this lever 182 is brought to a position in which a conductor 184 provided on the lever 182 contacts with a conductor 186 provided on a bed 188, whereupon an output signal corresponding to the output signal of the revolver forward rotation directing switch of the operating system 163 of FIG. 21 is outputted to the motor control circuit 140. Thereby, the electric power supply destination of the power source circuit 110 is changed over from the lamp 114 for illumination to the motor driving portion 141.

By the operator further moving the lever 182, the lever 182 is brought to a position in which by the action of the damper 183a, a conductor 185 contacts with a conductor 187 provided on the bed 188 after the lapse of a predetermined period, an output signal corresponding to the output signal of the delay circuit portion 147 of FIG. 21 is outputted to the motor control circuit 140. In response to these signals, the motor control circuit 140 outputs a rotation command for the revolver. Accordingly, the rotation of the revolver is delayed by the period from the time when the lever 182 has passed the conductor 186 until it arrives at the conductor 187. These operations also hold true of a reverse rotation command for the revolver. The time required to move the lever 182 from the position in which the conductor 184 contacts with the conductor 186 to the position in which the conductor 185 contacts with the conductor 187 can be adjusted by varying the resistance of the damper 183a, whereby the delay time can be adjusted. The spring 183 has the function of returning the lever 182 to its original position when the operator releases the lever 182.

As described above, according to the microscope control apparatus of the present invention, the revolver can be rotatively driven after the lapse of a preset delay time after the forward rotation and reverse rotation directing switches for the revolver are closed. Accordingly, if the time until the light of the lamp for illumination is decreased so as not to be dazzling is set as the aforementioned delay time, the dazzle by stray light during the interchange of the objective lenses could be prevented.

Also, the apparatus is provided with the observation form judging means and therefore, the aforedescribed delaying operation works only when the observation form is judged to be dark field observation.

What is claimed is:

1. An illuminating apparatus for a microscope provided with a revolver capable of inserting one of a plurality of objective lenses in an observation optical path to view a sample, comprising:

a light source for illuminating the sample;

a driving device having an electric motor, for rotating the revolver in response to rotation of said electric motor;

a power source circuit for producing an output;

a starting device for generating a start signal to start said electric motor;

a detector for detecting displacement of the revolver to a rotational position where one of the objective lenses is inserted into the observation optical path, and for generating an output signal indicative of the rotational position; and a switching circuit, coupled to said light source, said electric motor, said power source circuit, said starting device and said detector, for alternatively connecting said power source circuit to one of said light source and said electric motor to supply the output from said power source circuit, said switching circuit responding to the start signal to connect said power source circuit to said electric motor to supply the output from said power source circuit, and responding to the output signal from said detector to connect said power source circuit to said light source to supply the output from said power source circuit to said light source.

2. An illuminating apparatus for a microscope provided with a revolver capable of inserting one of a plurality of objective lenses in an observation optical path to view a sample, comprising:

a light source for illuminating the sample;

a driving device having an electric motor, for rotating the revolver in response to rotation of said electric motor;

a power source circuit for producing an output;

a starting device for generating for a start signal to start said electric motor; and a switching circuit, coupled to said light source, said electric motor, said power source circuit and said starting device, for alternatively connecting said power source circuit to one of said light source and said electric motor to supply the output from said power source circuit, said switching circuit responding to the start signal to disconnect said power source circuit from said light source and to connect said power source circuit to said electric motor to supply the output from said power source circuit to said electric motor.

3. An illuminating apparatus or a microscope provided with a revolver capable of inserting one of a plurality of objective lenses in an observation optical path to view a sample, comprising:

a light source for illuminating the sample;

a driving device having an electric motor, for rotating the revolver in response to rotation of said electric motor;

a starting device for generating a starting signal to start said electric motor; and a power supply system, coupled to said light source, said driving device and said starting device, for supplying electrical power to said light source and said electric motor, said power supply system responding to the starting signal by beginning the supplying of the electrical power to said electric motor, and stopping the supplying of the electrical power to said light source.

4. An illumination apparatus according to claim 3, wherein said power supply system includes:

an illumination control system, coupled to said light source and said starting device, for stopping the supplying of the electrical power to said light source when the starting signal is generated; and a motor control system, coupled to said electric motor and said starting device, for starting the supplying of the electrical power to said electric motor a predetermined time after generation of the starting signal.

5. An illumination apparatus according to claim 4, wherein said motor control system includes:

a delay circuit coupled to said starting device and responsive to the starting signal; and a motor drive circuit connected to said delay circuit and said electric motor.

6. An illumination apparatus according to claim 4, wherein the microscope includes a switching device for switching between a bright field observation mode and a dark field observation mode, and wherein said delay circuit is further coupled to said switching device and responds to a switch to the dark field observation mode by said switching device by performing a delay operation.

7. An illuminating apparatus for a microscope provided with a revolver capable of inserting one of a plurality of objective lenses in an observation optical path to view a sample, comprising:

a light source for illuminating the sample;

a driving device having an electric motor, for rotating the revolver in response to rotation of said electric motor;

a starting device for generating a start signal to start said electric motor;

a delay circuit connected to said starting device, for generating an output signal after a predetermined time after receipt of the start signal; and a power supply system, coupled to said light source, said electric motor, said starting device and said delay circuit, for supplying electrical power to said light source and said electric motor, said power supply system responding to the start signal by stopping the supplying of the electrical power to said light source, and responding to the output signal from said delay circuit by starting the supplying of the electrical power to said electric motor.

8. A microscope for viewing a sample, comprising:

optical elements for forming an observation optical path;

a revolver having a plurality of objective lenses and capable of inserting one of the objective lenses into the observation optical path;

a light source for illuminating the sample;

a driving device, coupled to said revolver, having an electric motor for rotating said revolver in response to rotation of said electric motor;

a power source circuit for producing an output; and a switching circuit, coupled to said light source, said driving device and said power source circuit, for alternatively connecting said power source circuit to one of said light source and said electric motor to supply the output from said power source circuit, said switching circuit connecting said power source circuit to said light source to supply the electrical power only when said revolver is in one of a plurality of rotational positions where one of said objective lenses is inserted into the observation optical path.

9. A microscope according to claim 8, further comprising a starting device coupled to said switching device, for starting said electric motor, and wherein said switching device responds to an operation of said starting device by connecting said power source circuit to said electric motor to supply the electrical power from said power source circuit to said electric motor.

10. A microscope according to claim 8, further comprising a detector, coupled to said revolver and said switching circuit, for detecting a displacement of said revolver to one of the rotational positions where one of the objective lenses is inserted into the observation optical path, and for generating an output signal, and wherein said switching device responds to the output signal from said detector by connecting said power source circuit to said light source to supply the electrical power from said power source circuit to said light source.

11. A microscope for viewing a sample, comprising:

optical elements for forming an observation optical path;

a revolver having a plurality of objective lenses and capable of inserting one of the objective lenses into the observation optical path;

a light source for illuminating the sample;

a driving device, coupled to said revolver, having an electric motor, for rotating said revolver in response to rotation of said electric motor;

a starting device for generating a start signal to start said electric motor;

a delay circuit connected to said starting device, for generating an output signal after a predetermined time after receipt of the start signal; and a power supply system, coupled to said light source, said electric motor, said starting device and said delay circuit, for supplying electrical power to said light source and said electric motor, said power supply system responding to the start signal by stopping the supplying of the electrical power to said light source, and responding to the output signal from said delay circuit by starting the supplying of the electrical power to said electric motor.

* * * * *

UNITED STATES PATENT AND TRADEMARK OFFICE
CERTIFICATE OF CORRECTION

PATENT NO. : 5,517,353

DATED : May 14, 1996

INVENTOR(S) : Ikoh et al.

It is certified that error appears in the above-indentified patent and that said Letters Patent is hereby corrected as shown below:

Col. 16,

Claim 2, line 33, delete "for" (second occurrence).
    Claim 3, line 45, "or" should be --for--;

Signed and Sealed this

Eighth Day of October, 1996

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,517,353
DATED : May 14, 1996
INVENTOR(S) :
Ikoh et al.

It is certified that error appears in the above-indentified patent and that said Letters Patent is hereby corrected as shown below:

Col. 16, Claim 3, line 56, "driving device" should be --electric motor--.

Col. 17, Claim 8, line 54, "driving device" should be --electric motor--.

Signed and Sealed this

Twenty-fifth Day of February, 1997

Attest:

BRUCE LEHMAN

*Attesting Officer*     *Commissioner of Patents and Trademarks*